(12) United States Patent
Tanizawa et al.

(10) Patent No.: US 12,119,879 B2
(45) Date of Patent: Oct. 15, 2024

(54) SIGNAL PROCESSING DEVICE

(71) Applicant: Tamagawa University and Tamagawa Academy, Tokyo (JP)

(72) Inventors: Ken Tanizawa, Tokyo (JP); Fumio Futami, Tokyo (JP)

(73) Assignee: Tamagawa University and Tamagawa Academy, Tokyo (JP)

( * ) Notice: Subject to any disclaimer, the term of this patent is extended or adjusted under 35 U.S.C. 154(b) by 67 days.

(21) Appl. No.: 17/995,667

(22) PCT Filed: Apr. 5, 2021

(86) PCT No.: PCT/JP2021/014510
§ 371 (c)(1),
(2) Date: Oct. 7, 2022

(87) PCT Pub. No.: WO2021/206060
PCT Pub. Date: Oct. 14, 2021

(65) Prior Publication Data
US 2023/0155685 A1  May 18, 2023

(30) Foreign Application Priority Data
Apr. 8, 2020  (JP) .................................. 2020-069856

(51) Int. Cl.
*H04B 10/516*  (2013.01)
*H04B 10/85*  (2013.01)

(52) U.S. Cl.
CPC ........... *H04B 10/516* (2013.01); *H04B 10/85* (2013.01)

(58) Field of Classification Search
CPC .... H04B 10/516; H04B 10/85; H04B 10/506; H04B 10/556; H04K 1/02
(Continued)

(56) References Cited

U.S. PATENT DOCUMENTS

2005/0180363 A1* 8/2005 Yano ...................... H04L 1/0041
370/335
2006/0202110 A1* 9/2006 Karlquist ............. G01R 23/175
250/227.12
(Continued)

FOREIGN PATENT DOCUMENTS

JP   2008092443 A  *  4/2008
JP   2010114662 A  *  5/2010
(Continued)

OTHER PUBLICATIONS

International Search Report issued in PCT/JP2021/014510; mailed Jun. 22, 2021.

*Primary Examiner* — Abbas H Alagheband
(74) *Attorney, Agent, or Firm* — Studebaker & Brackett PC

(57) ABSTRACT

The present invention addresses the problem of improving data transmission/reception equipment and transmission efficiency per hour. A light output unit 111 of a light transmitting/receiving device outputs n optical signals (where n is an integer value of 2 or more), each with a different wavelength, based on n respective pieces of data to be transmitted. From the n optical signals, a multiplexer 112 produces an optical signal multiplexed with respect to wavelength. From the multiplexed optical signal, an encryption unit 113 produces an encrypted signal by performing multi-level modulation on the basis of a Y-00 protocol. The problem is solved thereby.

7 Claims, 12 Drawing Sheets

(58) Field of Classification Search
USPC ......................................................... 398/183
See application file for complete search history.

(56) References Cited

U.S. PATENT DOCUMENTS

| | | | | |
|---|---|---|---|---|
| 2012/0328100 | A1* | 12/2012 | Hirota ..................... | H04L 9/002 |
| | | | | 380/256 |
| 2014/0133870 | A1* | 5/2014 | Lee ....................... | H04B 10/541 |
| | | | | 398/186 |
| 2014/0362874 | A1* | 12/2014 | Nishimoto ............. | H04B 10/40 |
| | | | | 398/115 |
| 2014/0363159 | A1* | 12/2014 | Chien ................... | H04B 10/548 |
| | | | | 398/43 |
| 2016/0094305 | A1* | 3/2016 | Yamashita ........... | H04B 10/564 |
| | | | | 398/79 |
| 2017/0250776 | A1* | 8/2017 | Morsy-Osman ....... | H04B 10/60 |
| 2020/0162172 | A1* | 5/2020 | Sridhar .................. | H04L 27/12 |
| 2021/0021352 | A1* | 1/2021 | Yoshino ............... | H04B 10/556 |

FOREIGN PATENT DOCUMENTS

| | | | | |
|---|---|---|---|---|
| JP | 5170586 B2 | | 3/2013 | |
| JP | 2014-239309 A | | 12/2014 | |
| JP | 2016032256 A | * | 3/2016 | |
| JP | 2016-072834 A | | 5/2016 | |
| KR | 20150104894 A | * | 9/2015 | ............. H04J 14/02 |
| WO | WO-2005059633 A2 | * | 6/2005 | ........... H04B 10/299 |
| WO | WO-2013091706 A1 | * | 6/2013 | ......... H04B 10/5161 |

* cited by examiner

SIGNAL PROCESSING DEVICE

TECHNICAL FIELD

The present invention relates to a signal processing device.

BACKGROUND ART

In recent years, the importance of security countermeasures has been increasing in the communication of information. A network system that makes up the Internet is described by the OSI reference model, which has been formulated by the International Organization for Standardization. The OSI reference model is split into seven layers, from the layer 1 physical layer to the layer 7 application layer, and the interfaces that connect respective layers are either de facto standardized or are standardized through a standards body. The lowest layer from among the seven layers is the physical layer which is responsible for actual transmission and reception of signals by wire or wirelessly. Presently, security (which relies on mathematical ciphers in many cases) is implemented at layer 2 and above, and security countermeasures are not performed in the physical layer. However, there is the risk of eavesdropping in the physical layer. For example, in optical fiber communication which is representative of wired communication, it is possible in principle to introduce a branch into an optical fiber, and extract some of the signal power to thereby steal large amounts of information in one occasion. Accordingly, the present applicant is developing a predetermined protocol given in Patent Document 1, for example, as an encryption technique for the physical layer.

Patent Document 1: Japanese Unexamined Patent Application, Publication No. 5170586

DISCLOSURE OF THE INVENTION

Problems to be Solved by the Invention

On the other hand, with the spread of high-quality image distribution services, it is desired to improve transmission/reception equipment and transmission efficiency per hour of the data. However, it is difficult to sufficiently meet such requirements by merely applying the protocol disclosed in Patent Literature 1 to the data to be transmitted and received.

The present invention has been made in light of such a situation, and an object of the present invention is to improve transmission/reception equipment and transmission efficiency per hour of the data.

Means for Solving the Problems

To achieve the above object, a signal processing device according to an aspect of the present invention includes: an optical output unit that outputs each of n first type optical signals having different wavelengths based on each of n pieces of data (where n is an integer value of 2 or more) to be transmitted;
a multiplexing unit that multiplexes each of the n first type optical signals to generate one second type optical signal wavelength-multiplexed; and
a multi-level modulation unit that performs multi-level modulation on the second type optical signal based on a predetermined algorithm to generate a third type optical signal. To achieve the above object, a signal processing device according to another aspect of the present invention includes:
a modulation unit that converts a first type optical signal subjected to first multi-level modulation based on a predetermined algorithm after being multiplexed with respect to n (where n is an integer value of 2 or more) wavelengths into a second type optical signal wavelength-multiplexed, using second modulation based on an algorithm corresponding to a predetermined algorithm; and
a separation unit that separates the second type optical signal into respective n third type optical signals.

Effects of the Invention

By virtue of the present invention, it is possible to improve transmission/reception equipment and transmission efficiency per hour of the data.

PREFERRED MODE FOR CARRYING OUT THE INVENTION

An embodiment of the present invention will be described below with reference to the drawings.

Figure 1:
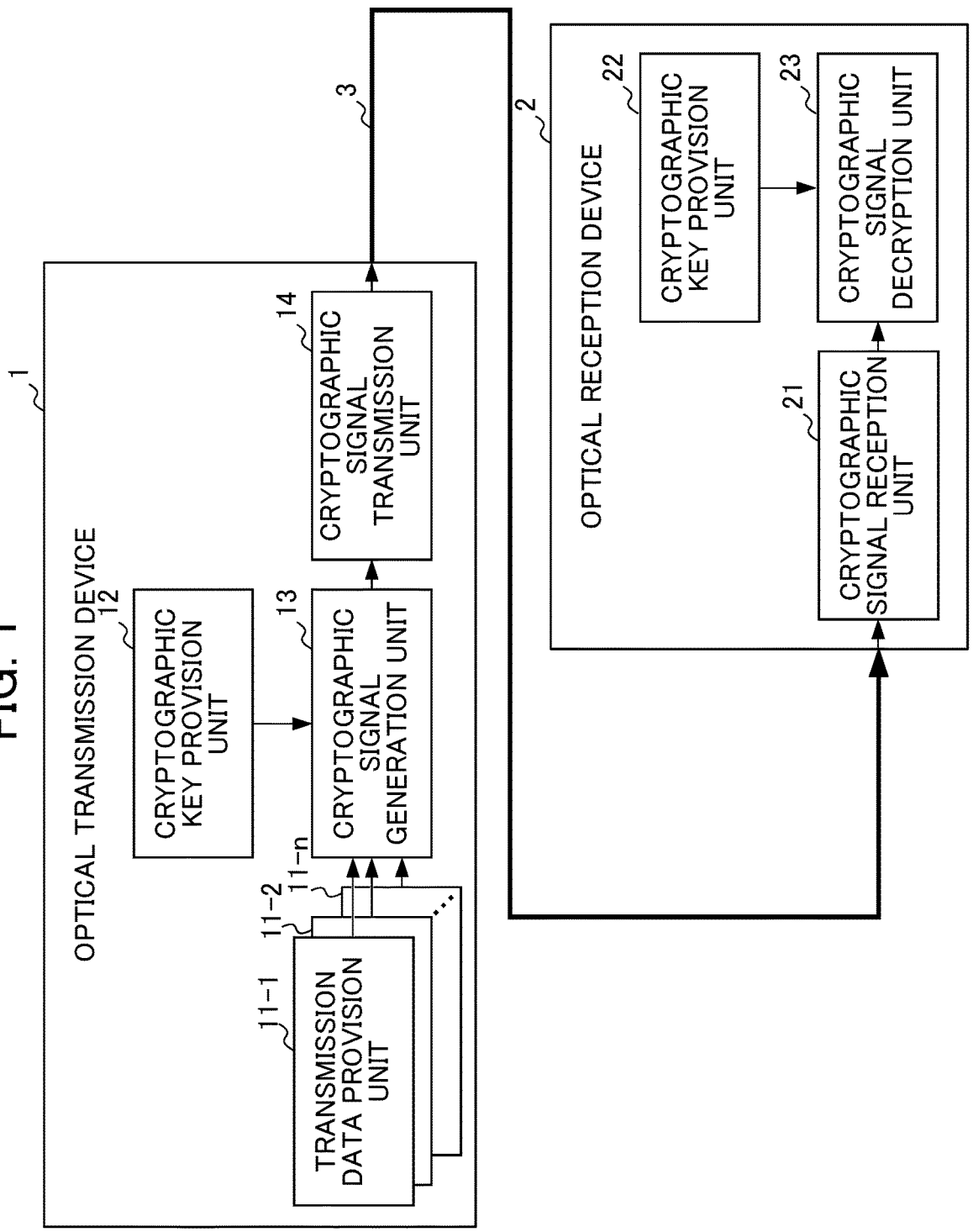
FIG. 1 is a block diagram showing an example of a configuration of a transmission/reception system including an optical transmission device and an optical reception device according to an embodiment of the present invention.

FIG. 1 is a block diagram showing an example of a configuration of a transmission/reception system including optical transmission device and optical reception device according to an embodiment of the present invention. The transmission/reception system in the example of FIG. 1 includes an optical transmission device 1, an optical reception device 2, and an optical communication cable 3 for connecting these devices.

The optical transmission device 1 includes transmission data provision units 11-1 to 11-n (n being an integer value of 2 or more), a cryptographic key provision unit 12, a cryptographic signal generation unit 13, and a cryptographic signal transmission unit 14.

Each of the transmission data provision units 11-1 to 11-n generates plaintext data to be transmitted or acquires plaintext data from a generation source (not shown), and provides the plaintext data to the cryptographic signal generation unit 13 as transmission data. The cryptographic key provision unit 12 provides the cryptographic signal generation unit 13 with a cryptographic key to use in encryption at the cryptographic signal generation unit 13. It is sufficient if the cryptographic key is a key that can be used in encryption and decryption by the optical transmission device 1 and the optical reception device 2, and there is no limitation in particular on the source of provision of the cryptographic key (place where the cryptographic key is generated or place where the cryptographic key is stored), a method of providing the cryptographic key, and methods of encryption and decryption. The cryptographic signal generation unit 13 converts the transmission data provided from the transmission data provision units 11-1 to 11-n into optical signals of a plurality of wavelengths, respectively, multiplexes the wavelengths, encrypts the transmission data using the cryptographic key provided from the cryptographic key provision unit 12, and provides encrypted transmission data to the cryptographic signal transmission unit 14 which will be described below. The optical signal generated from the cryptographic signal generation unit 13, that is, the optical signal superimposed with the encrypted transmission data is hereinafter referred to as a "cryptographic signal". The cryptographic signal transmission unit 14 transmits the cryptographic signal generated from the cryptographic signal generation unit 13 to the optical reception device 2 via the optical communication cable 3 after amplifying the cryptographic signal as necessary.

As described above, the cryptographic signal (optical signal) is output from the optical transmission device 1, transferred through the optical communication cable 3, and received by the optical reception device 2. The optical reception device 2 decrypts the received cryptographic signal, thereby causing the plaintext data (transmission data) to be restored. For this reason, the optical reception device 2 includes a cryptographic signal reception unit 21, a cryptographic key provision unit 22, and a cryptographic signal decryption unit 23.

The cryptographic signal reception unit 21 receives the wavelength-multiplexed cryptographic signal (optical signal), and provides the signal to the cryptographic signal decryption unit 23 after amplifying and compensating the signal as necessary. The cryptographic key provision unit 22 provides the cryptographic signal decryption unit 23 with a cryptographic key that is used at the time of decrypting cryptographic signal. The cryptographic signal decryption unit 23 separates the wavelength-multiplexed cryptographic signal provided from the cryptographic signal reception unit 21 for each wavelength component, uses the cryptographic key provided from the cryptographic key provision unit 22 to decrypt the cryptographic signal provided from the cryptographic signal reception unit 21, and thus restores the plaintext data (transmission data).

Thus, in the present embodiment, the cryptographic signal is employed as an example of an optical signal transferred by the optical communication cable 3. For this reason, in the example of FIG. 1, optical fiber communication, which is representative of wired communication, is employed as a method of communicating the cryptographic signal. In optical fiber communication, it is theoretically possible for a third party to steal large amounts of information (here, cryptographic signal) at once by introducing a branch into an optical fiber and extracting some of the signal power. Therefore, even when the cryptographic signal is stolen, there is a need for a method that the meaning and content of the cryptographic signal, that is, the content of the plaintext (transmission data) cannot be recognized by a third party. As such as method, the applicant has developed a technique using the Y-00 optical communication quantum cryptography.

Figure 2:
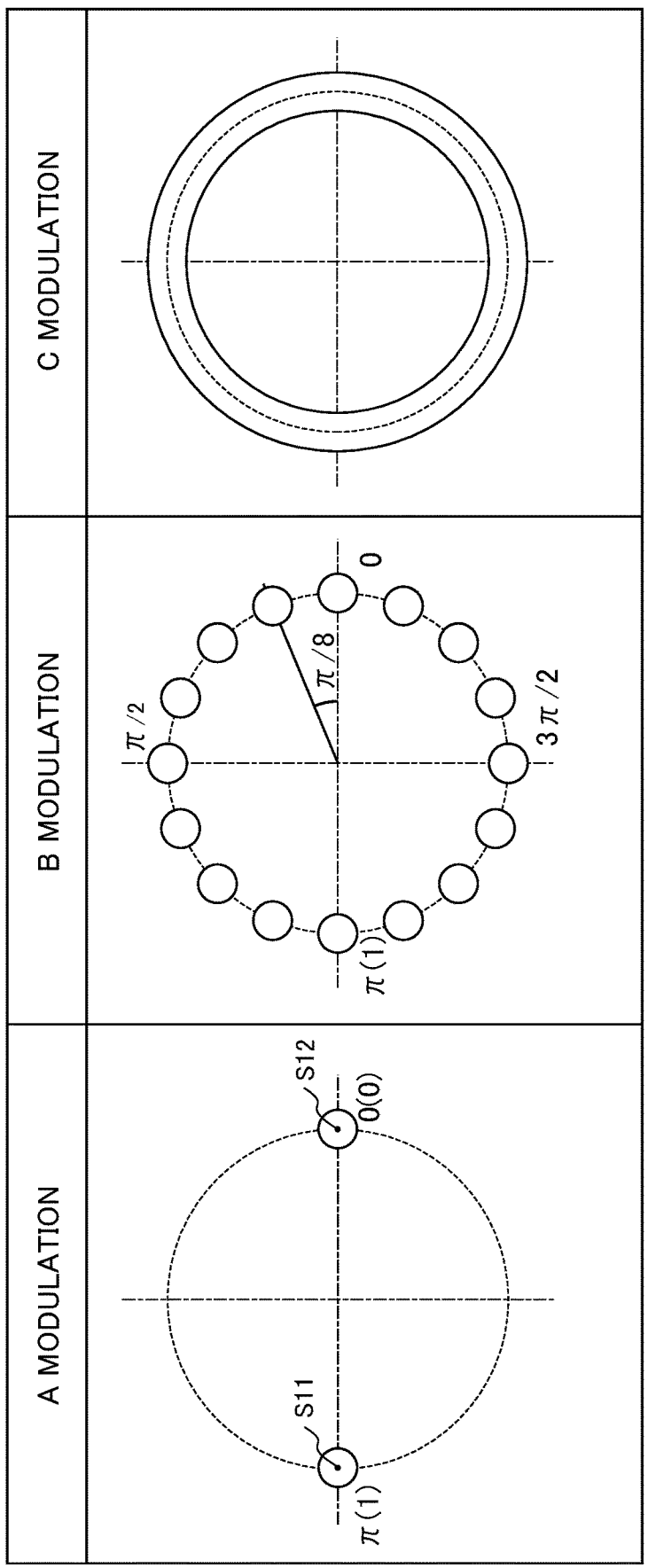
FIG. 2 is a view for describing an overview of principles of a Y-00 optical communication quantum cryptography applied to the transmission/reception system of FIG. 1.
Figure 3:
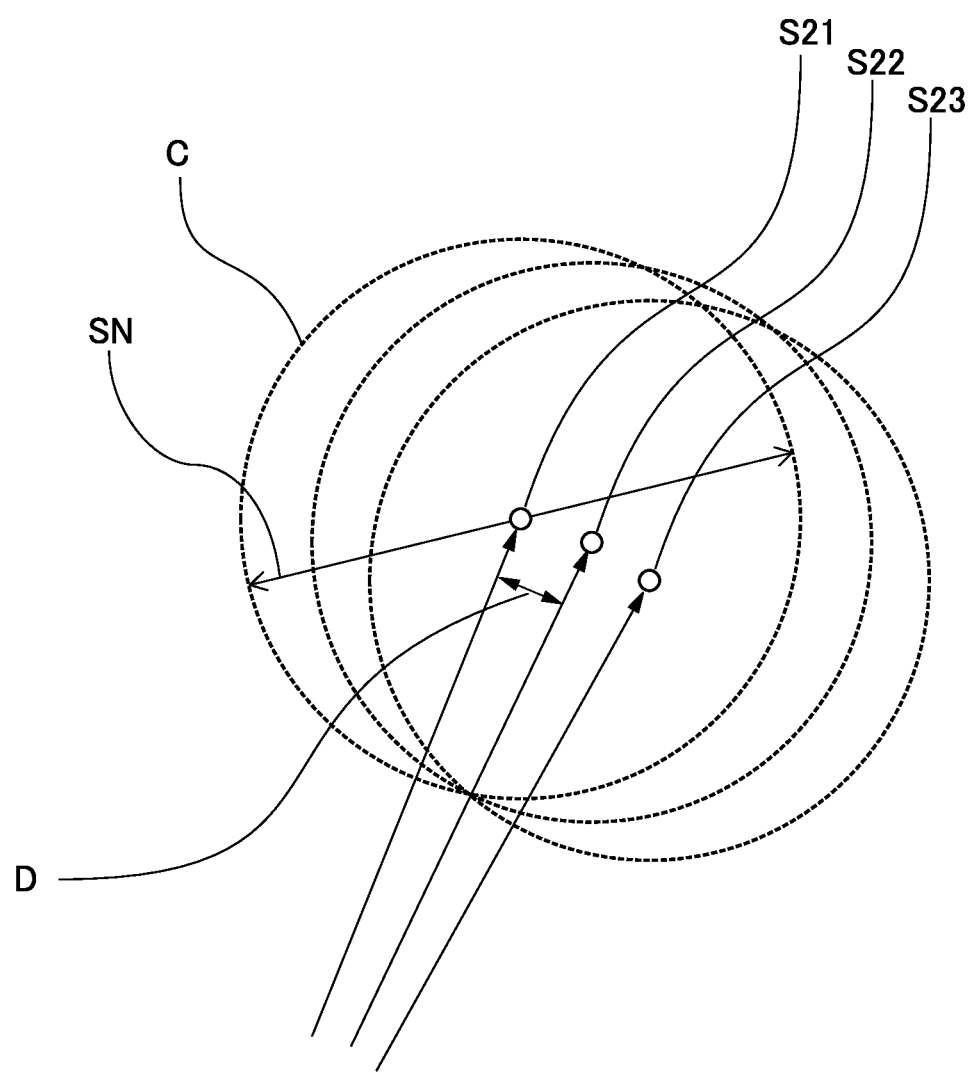
FIG. 3 is an enlarged view of C modulation shown in FIG. 2 such that in order to enable visual recognition of the arrangement of three adjacent symbol points among the arrangement of N=4096 symbol points in the phase modulation of C modulation shown in FIG. 2.

The Y-00 optical communication quantum cryptography is characterized by "a ciphertext cannot be acquired correctly due to the effect of quantum noise", and has been developed by the applicant. In the Y-00 optical communication quantum cryptography, transmission data (plaintext) is represented by one or more aggregates of bit data of "0" or "1". Each bit data that makes up the transmission data is modulated by a predetermined algorithm to a predetermined value among M (M being an integer value of 2 or more) values. Therefore, the numerical value M is hereinafter referred to as "modulation number M". In the Y-00 optical communication quantum cryptography, encryption of transmission data (plaintext) is performed by modulating at least one of the phase or amplitude of an optical signal (carrier wave) by one of the modulation number M of levels, in accordance with a cryptographic key present on the encrypting side and the decrypting side. By making the modulation number M a very large number, the feature of "not allowing an eavesdropper to correctly obtain ciphertext due to effects of quantum noise" is realized. Regarding the "predetermined protocol" employed in the Y-00 optical communication quantum cryptography, please refer to Japanese Patent No. 5170586, for example. With reference to FIG. 2 and FIG. 3, simple description is given regarding an overview of the principles of the Y-00 optical communication quantum cryptography, taking phase modulation as an example.

FIG. 2 is a view for describing an overview of principles of a Y-00 optical communication quantum cryptography applied to the transmission/reception system of FIG. 1. FIG. 3 is an enlarged view shown in FIG. 2 such that in order to enable visual recognition of the arrangement of three adjacent symbol points among the arrangement of M=4096 symbol points in the phase modulation shown in FIG. 2. The A modulation through C modulation shown in FIG. 2 show IQ planes that represent the phase and amplitude (intensity) of an optical signal, with the intersection of the vertical axis and the horizontal axis as the origin. When a point on one of these IQ planes is determined, the phase and amplitude of the optical signal are uniquely determined. Taking the origin of the IQ plane as the start point, the phase is the angle formed between the line segment having an endpoint at the point representing the optical signal and the line segment representing phase 0. In contrast, the amplitude is the distance between the point representing the optical signal and the origin of the IQ plane.

The A modulation shown in FIG. 2 is to facilitate understanding of the Y-00 optical communication quantum cryptography, and is a graph for describing the principles of normal two-level modulation. For example, if plaintext (transmission data) is superimposed as is on an optical signal (carrier wave) and transmitted, two-level modulation indicated as the A modulation shown in FIG. 2 will be performed on each item of bit data (1 or 0) that makes up the plaintext. In this case, in the A modulation shown in FIG. 2, the arrangement of a point (hereinafter, referred to as a "symbol point") indicating the optical signal after phase modulation when the bit data is "0" is the arrangement of a symbol point S11 given by 0(0) on the right side on the horizontal axis, in other words an arrangement where the phase is 0. In contrast, the arrangement of a symbol point after phase modulation when the bit data is 1 is the arrangement of a symbol point S12 given by $\pi(1)$ on the left side on the horizontal axis, in other words an arrangement when the phase is $\pi$. Here, the solid-line circle surrounding the symbol point S11 shows an example of the fluctuation range of the quantum noise when the optical signal of the symbol point S11 is received. For a symbol point S12, similarly, an example of fluctuation range of the quantum noise is shown as a solid-line circle surrounding the symbol point S12.

The B modulation shown in FIG. 2 is to describe principles of phase modulation when the modulation number M=16, in a case where the Y-00 optical communication quantum cryptography is employed. In the case of the example of B modulation shown in FIG. 2, a random level from among eight levels is generated by using the cryptographic key, for each item of bit data that makes up the plaintext. The phase modulation is performed by, for each bit, rotating the phase of the symbol point in the normal two-level modulation indicated as the A modulation shown in FIG. 2 (the point for phase 0 corresponding to 0 and the point for phase $\pi$ corresponding to 1) in the IQ plane in accordance with a level from among the eight levels and is generated randomly. Because the value that bit data can take is binary—either "0" or "1", as a result, when the phase modulation of the example of B modulation shown in FIG. 2 is performed, the arrangement of the symbol points becomes an arrangement of 16 points (number of modulations M=16) for which the phase respectively differs by $\pi/8$.

However, in the case of the example of B modulation shown in FIG. 2, the value—"0" or "1"— that the bit data can take is merely modulated to one of the levels from among the modulation number M=16 levels. Therefore, if the optical signal (cryptographic signal), which has the arrangement of 16 symbol points, is intercepted, there is the risk that the meaning of its content—in other words the content of the plaintext (transmission data)—will be recognized by a third party. In other words, the security of the Y-00 optical communication quantum cryptography is not sufficient at only around the modulation number M=16. Accordingly, in practice, as indicated by the C modulation shown in FIG. 2, a very large number, for example 4096, is employed as the modulation number M, and the security of the Y-00 optical communication quantum cryptography is improved.

The C modulation shown in FIG. 2 is to describe principles of phase modulation when the modulation number M=4096, in a case where the Y-00 optical communication quantum cryptography is employed. FIG. 3 is an enlarged view of C modulation shown in FIG. 2 such that in order to enable visual recognition of the arrangement of three adjacent symbol points among the arrangement of M=4096 symbol points in the phase modulation of C modulation shown in FIG. 2. As shown in FIG. 3, for each symbol point from S21 to S23, there is fluctuation due to shot noise (quantum noise) in only a range SN. Specifically, for example, the solid-line circle C surrounding the symbol point S21 shown in FIG. 3 shows an example of the fluctuation range SN of the quantum noise when the optical signal of the symbol point S21 is received. The shot noise is noise due to the quantum nature of light, is truly random, and has a characteristic of being one of the laws of physics that is not set aside. When phase modulation with a very large number, such as 4096, as the modulation number M, is performed, adjacent symbol points cannot be discriminated from one another because they are obscured by shot noise, as shown in FIG. 3. Specifically, when the distance D between two adjacent symbol points S21 and S22 is sufficiently smaller than the range SN of shot noise (when phase modulation with a very large number as the modulation number M is performed so as to make the distance D this small), it is difficult to determine the position of the original symbol points from phase information measured at a receiving side. In other words, for example, it is assumed that the phase measured on the receiving side at a certain time corresponds to the position of the symbol point S22 shown in FIG. 3. In such a case, it not possible to distinguish whether the symbol point is something transmitted as an optical signal for a symbol point S22 or whether this was actually something transmitted as an optical signal for symbol points S21 and S23 but was measured as the symbol point S22 due to the effect of shot noise. To summarize the above, modulation where the modulation number M is very large is employed in the Y-00 optical communication quantum cryptography.

Although the modulation is phase modulation in the example of FIGS. 2 and 3, the modulation may be amplitude (intensity) modulation instead of or in addition to phase modulation. In other words, optical signal modulation using the Y-00 protocol can employ any modulation scheme such as intensity modulation, amplitude modulation, phase modulation, frequency modulation, and quadrature amplitude modulation.

In addition, as described above, with the Y-00 optical communication quantum cryptography, it becomes possible to make the distance D between two symbol points sufficiently smaller than the range SN of shot noise in any modulation scheme, and the feature "not allowing an eavesdropper to correctly obtain ciphertext due to effects of quantum noise" becomes possible. In addition, although quantum noise ensures security, in practice an eavesdropper is prevented from obtaining the correct ciphertext due to the effect of all noise, including classical noise such as thermal noise in addition to quantum noise.

Figure 4:
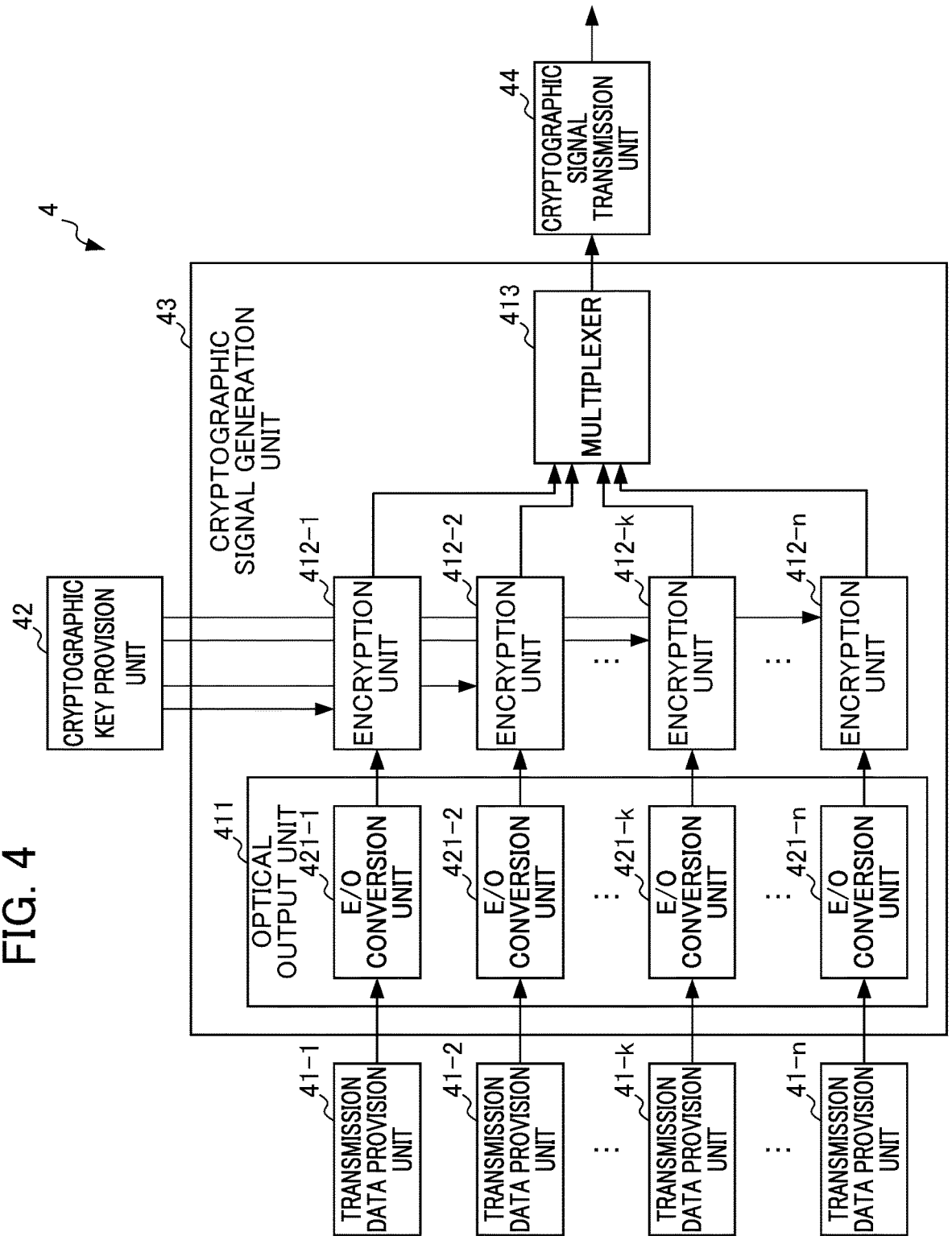
FIG. 4 is a block diagram showing a detailed configuration example of an optical transmission device that forms the basis of the optical transmission device in FIG. 1.

FIG. 4 is a block diagram showing a detailed configuration example of an optical transmission device that forms the basis of the optical transmission device shown in FIG. 1. An optical transmission device 4 (hereinafter, referred to as a "basic optical transmission device 4") to be the basis shown in FIG. 4 basically has the same configuration as the optical transmission device 1 shown in FIG. 1. Specifically, the basic optical transmission device 4 includes transmission data provision units 41-1 to 41-$n$, a cryptographic key provision unit 42, a cryptographic signal generation unit 43, and a cryptographic signal transmission unit 44. Further, the transmission data provision units 41-1 to 41-$n$, the cryptographic key provision unit 42, the cryptographic signal generation unit 43, and the cryptographic signal transmission unit 44 basically have the same function as the transmission data provision units 11-1 to 11-$n$, the cryptographic key provision unit 12, the cryptographic signal generation unit 13, and the cryptographic signal transmission unit 14, respectively. As a result, the basic optical transmission device 4 can use each of the transmission data provided from the transmission data provision units 11-1 to 11-$n$ as optical signals of a plurality of wavelengths. Further, the basic optical transmission device 4 can transmit the optical signals of the plurality of wavelengths as cryptographic signals in a wavelength-multiplexed state.

FIG. 4 shows a detailed configuration example of the basic optical transmission device 4. The cryptographic signal generation unit 43 of the basic optical transmission device 4 in the example of FIG. 4 includes an optical output unit 411, encryption units 412-1 to 412-$n$, and a multiplexer 413. Further, the optical output unit 411 includes E/O conversion units 421-1 to 421-$n$. Here, as shown in FIG. 4, each of the transmission data provision units 41-1 to 41-$n$ basically has the same configuration, each of the E/O conversion units 421-1 to 421-$n$ basically has the same configuration, and each of the encryption units 412-1 to 412-$n$ basically has the same configuration. Therefore, a description will be given below with reference to FIG. 4 with respect to signal processing in a transmission data provision unit 41-$k$ ($k$ being an integer value from 1 to n), an E/O conversion unit 421-$k$, and an encryption unit 412-$k$.

The transmission data provision unit 41-$k$ provides plaintext data (transmission data). In other words, the transmission data is provided from the transmission data provision unit 41-$k$ to the E/O conversion unit 421-$k$ constituting the optical output unit 411.

The E/O conversion unit 421-$k$ has a function of converting an electrical signal into an optical signal. In other words, the transmission data (electrical signal) provided to the E/O conversion unit 421-$k$ is output as an optical signal of a certain wavelength corresponding to the transmission data.

The encryption unit 412-$k$ modulates the optical signal into a very large number of multi-levels using the cryptographic key provided from the cryptographic key provision unit 42 and encrypts the optical signal. In other words, the optical signal output from the E/O conversion unit 421-$k$ is modulated into a multi-level by the encryption unit 412-$k$ to become an encrypted cryptographic signal.

As described above, the E/O conversion units 421-1 to 421-$n$ output n optical signals having different wavelengths, respectively. In other words, n cryptographic signals output from the encryption units 412-1 to 412-$n$ become n cryptographic signal having different wavelengths, respectively. As a result, n cryptographic signals having different wavelengths corresponding to n pieces of transmission data are output from the encryption units 412-1 to 412-$n$, respectively.

The multiplexer 413 multiplexes n cryptographic signals having different wavelengths to form one wavelength-multiplexed cryptographic signal, that is, one cryptographic signal containing n wavelength components. As a result, the cryptographic signal generation unit 43 generates one cryptographic signal containing n wavelength components. The cryptographic signal transmission unit 44 amplifies the cryptographic signal generated from the cryptographic signal generation unit 43 as necessary, and then transmits the signal to the optical reception device via the optical communication cable. As a result, n pieces of transmission data are simultaneously transmitted through one optical fiber as cryptographic signals.

In this way, the basic optical transmission device 4 can multiplex n cryptographic signals based on n pieces of transmission data and simultaneously transmit the signals through one optical fiber. In other words, the transmission/reception equipment and transmission efficiency per hour of the transmission data is improved.

Here, the basic optical transmission device 4 shown in FIG. 4 includes n encryption units 412-1 to 412-$n$ having the same number as the number of pieces of transmission data. In other words, the basic optical transmission device 4 needs to include n encryption units 412-1 to 412-$n$ having the same number as the number of pieces of transmission data. When it is desired to increase the number of pieces of transmission data from n to n+1 in such a basic optical transmission device 4, the following configuration can be adopted. In other words, the basic optical transmission device 4 can further include a set of a transmission data provision unit 41-(n+1), an E/O conversion unit 421-(n+1), and an encryption unit 412-(n+1), and can be configured to input a cryptographic signal from the encryption unit 412-(n+1) to the multiplexer 413. In other words, when it is desired to increase the number of pieces of transmission data from n to n+1, the basic optical transmission device 4 can increase the number of pieces of transmission data by increasing the set of the transmission data provision unit 41-(n+1), an E/O conversion unit 421-(n+1), and an encryption unit 412-(n+1). In other words, the basic optical transmission device 4 has a configuration suitable for flexibly increasing the number of pieces of transmission data.

However, since each of the encryption units 412-1 to 412-$n$ modulates a signal into a very large number of multi-levels compared to multi-level modulation performed for a normal purpose (a purpose other than encryption), manufacturing costs and a size increase. Therefore, there is a problem that the overall manufacturing costs and size of the basic optical transmission device 4 increase according to the number of pieces of transmission data. Therefore, the optical transmission device 1 according to the embodiment of the present invention has a configuration capable of preventing an increase in the overall manufacturing costs of the optical transmission device 1 according to the number of pieces of transmission data.

Figure 5:
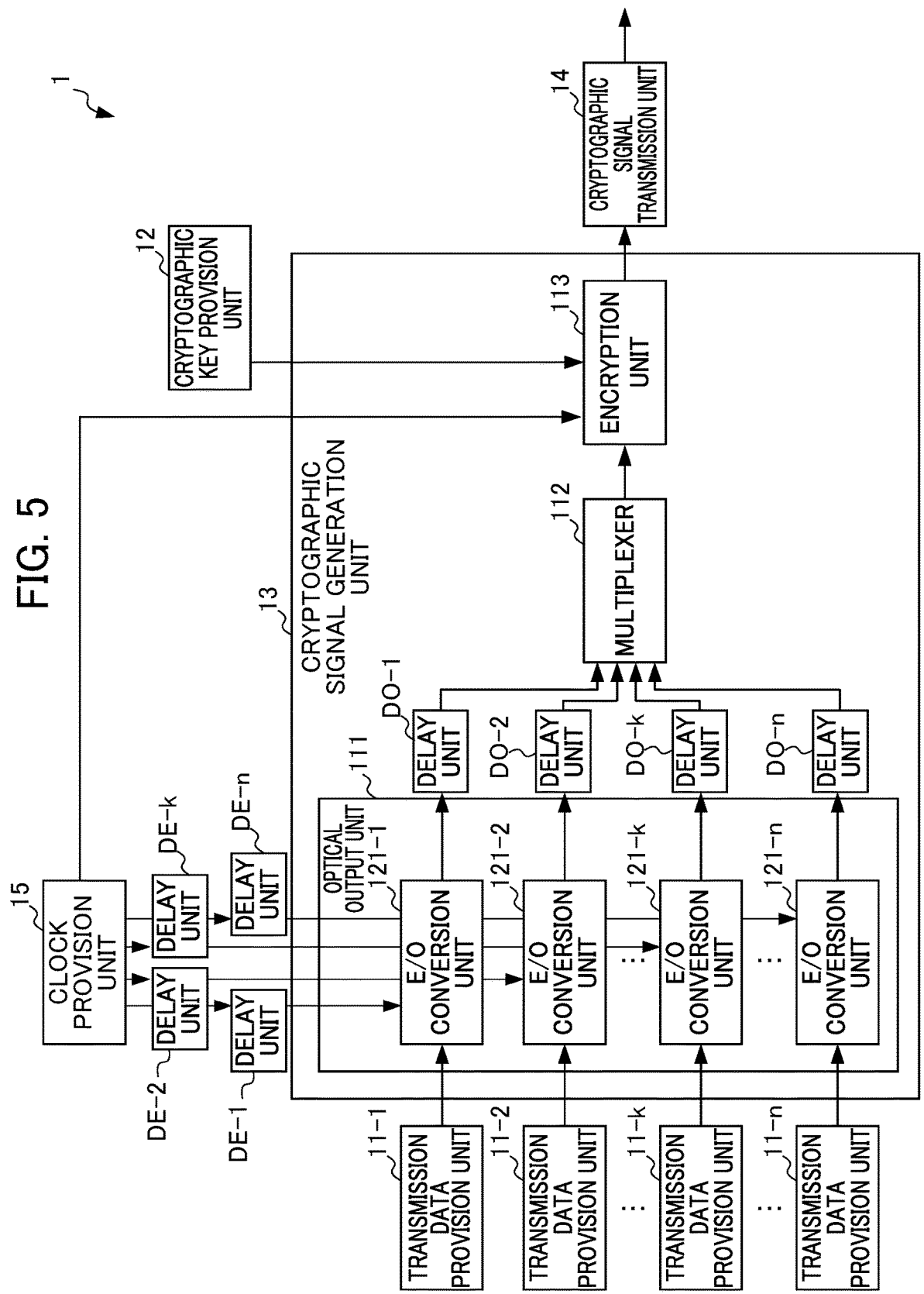
FIG. 5 is a block diagram showing a detailed configuration example of the optical transmission device in FIG. 1.

A description will be given below with reference to FIG. 5 with respect to a detailed configuration example of the optical transmission device according to the embodiment of the present invention which is developed from the basic optical transmission device 4 shown in FIG. 4. FIG. 5 is a block diagram showing a detailed configuration example of the optical transmission device shown in FIG. 1. In the example of FIG. 5, the optical transmission device 1 includes the transmission data provision units 11-1 to 11-$n$, the cryptographic key provision unit 12, the cryptographic signal generation unit 13, and the cryptographic signal transmission unit 14, as shown in FIG. 1. Further, the optical transmission device 1 in the example of FIG. 5 includes a clock provision unit 15 and delay units DE-1 to DE-n which are not shown in FIG. 1. The cryptographic signal generation unit 13 of the optical transmission device 1 in the example of FIG. 5 includes an optical output unit 111, a multiplexer 112, an encryption unit 113, and delay units DO-1 to DO-n. Further, the optical output unit 111 of the cryptographic signal generation unit 13 in the example of FIG. 5 includes E/O conversion units 121-1 to 121-n.

The cryptographic signal generation unit 13 of the optical transmission device 1 in the example of FIG. 5 differs from the basic optical transmission device 4 in FIG. 4 in the following points. In other words, the basic optical transmission device 4 in FIG. 4 encrypts the n optical signals having different wavelengths provided from the n transmission data provision units 41-1 to 41-n to form cryptographic signals. On the other hand, the encryption unit 113 of the optical transmission device 1 in FIG. 5 collectively encrypts n optical signals having different wavelengths provided from the n transmission data provision units 11-1 to 11-n to output the signals as cryptographic signals. Due to the difference described above, the optical transmission device 1 in FIG. 5 includes the delay units DE-1 to DE-n and the delay units DO-1 to DO-n.

Here, as shown in FIG. 5, each of the transmission data provision units 11-1 to 11-n basically has the same configuration, each of the E/O conversion units 121-1 to 121-n basically has the same configuration, each of the delay units DE-1 to DE-n basically has the same configuration, and each of the delay units DO-1 to DO-n basically has the same configuration. Therefore, a description will be given below with reference to FIG. 5 with respect to signal processing in a transmission data provision unit 41-k, an E/O conversion unit 121-k, a delay unit DE-k, and a delay unit DO-k.

The clock provision unit 15 provides a clock signal for modulation in the E/O conversion units 121-1 to 121-n and the encryption unit 113. The delay unit DE-k delays the clock signal provided from the clock provision unit 15 by a predetermined time width. In other words, the delay unit DE-k can delay a timing at which the clock signal is provided (input) to the E/O conversion unit 121-k. Specifically, for example, the delay unit DE-k is provided as a transmission line for the clock signal on a substrate having a length corresponding to a predetermined timing to be delayed. In this case, the clock signal is delayed by the time width required to propagate through the transmission line. Further, for example, the delay unit DE-k may be provided as a digital circuit that outputs a signal delayed by the predetermined time width after the signal is input.

The transmission data provision unit 11-k generates plaintext data (transmission data) to be transmitted or acquires plaintext data from a generation source (not shown), and provides the data as transmission data to the cryptographic signal generation unit 13 as described with reference to FIG. 1.

The E/O conversion unit 121-k converts the electrical signal of the transmission data provided from the transmission data provision unit 11-k into an optical signal modulated by any modulation scheme (hereinafter, appropriately referred to as a "first type optical signal" to distinguish from other optical signals), and outputs the converted signal. The E/O conversion unit 121-k is configured by direct modulation of a laser or a combination of a laser and various modulation elements, and outputs a first type optical signal. Specifically, for example, the E/O conversion unit 121-k is configured by a carrier wave generation unit (laser light source with a predetermined wavelength) and one or more modulation elements (for example, a phase modulator, Mach-Zehnder modulator, and an IQ modulator). Further, for example, the E/O conversion unit 121-k may include a modulated laser generation unit, and may be configured to directly output a modulated optical signal. A specific configuration example of the E/O conversion unit 121-k will be described with reference to FIGS. 6 and 7. At this time, the E/O conversion unit 121-k performs modulation at a timing based on the clock signal provided from the clock provision unit 15 via the delay unit DE-k, and outputs the first type optical signal. In other words, the modulation is performed by the E/O conversion unit 121-k at the timing based on the clock signal provided from the clock provision unit 15 via the delay unit DE-k.

The delay unit DO-k delays the first type optical signal output from the E/O conversion unit 121-k by a predetermined time width. In other words, the delay unit DO-k can delay a timing at which the first type optical signal output from the E/O conversion unit 121-k is provided (input) to the multiplexer 112. Specifically, for example, the delay unit DO-k is provided as a transmission path (for example, an optical fiber) for the optical signal having a length corresponding to a predetermined timing to be delayed. In this case, the first type optical signal is delayed by the time width required to propagate through the transmission line.

As described above, the time widths delayed by the delay units DE-1 to DE-n and the delay units DO-1 to DO-n are adjusted as appropriate. As a result, n first type optical signals output (provided) from the delay units DO-1 to DO-n are provided to the multiplexer 112 at the same timing. The amount of time width to be delayed by the delay units DE-1 to DE-n and the delay units DO-1 to DO-n will be described below.

The multiplexer 112 converts each of the n first type optical signals into one wavelength-multiplexed optical signal (hereinafter, appropriately referred to as a "second type optical signal" to distinguish from other optical signals). In other words, the multiplexer 112 is a wavelength multiplexing device that multiplexes n first type optical signals into one optical signal. Specifically, an example of the multiplexer 112 include an optical coupler configured by an array waveguide diffraction grating or an optical filter such as an optical thin film. As described above, the n first type optical signals output (provided) from the delay units DO-1 to DO-n are provided to the multiplexer 112 at the same timing. As a result, each of n wavelength components (each of the first type optical signals) included in one second type optical signal output (provided) from the multiplexer 112 is included at the same timing.

The cryptographic key provision unit 12 provides the cryptographic signal generation unit 13 with the cryptographic key used for encryption in the cryptographic signal generation unit 13, as described with reference to FIG. 1.

The encryption unit 113 modulates the second type optical signal into a very large number of multi-levels using the cryptographic key provided from the cryptographic key provision unit 12 and encrypts the optical signal, thereby generating an encrypted cryptographic signal (hereinafter, appropriately referred to as a "third type optical signal" to distinguish from other optical signals). At this time, the encryption unit 113 modulates the second type optical signal at the timing based on the clock signal provided from the clock provision unit 15. In other words, the modulation is performed by the encryption unit 113 at the timing based on the clock signal provided from the clock provision unit 15. Further, the encryption unit 113 is configured by an interferometer or a combination of various modulation elements, and outputs the third type optical signal. Specifically, for example, the encryption unit 113 is configured by one or more modulation elements (for example, a phase modulator, Mach-Zehnder modulator, and an IQ modulator). Further, the encryption unit 113 includes a cryptographic generation unit that determines the amount of modulation for converting the second type optical signal into the third type optical signal (cryptographic signal) based on the cryptographic key provided from the cryptographic key provision unit 12 and the algorithm for Y-00 protocol or determines the amount of modulation in each of the one or more modulation elements described above. A specific configuration example of the encryption unit 113 will be described with reference to FIGS. 8 to 10.

As described with reference to FIG. 1, the cryptographic signal transmission unit 14 amplifies the cryptographic signal generated from the cryptographic signal generation unit 13 as necessary, and then transmits the signal to the optical reception device 2 via the optical communication cable 3. As a result, n pieces of transmission data are simultaneously transmitted through one optical fiber as cryptographic signals.

To summarize the above, the optical transmission device 1 in FIG. 5 turns the n first type optical signals having different wavelengths corresponding to the transmission data provided from the n transmission data provision units 11-1 to 11-$n$, into one second type optical signal which is wavelength-multiplexed in the multiplexer 112. Then, the optical transmission device 1 modulates the second type optical signal into a multi-level based on the algorithm for Y-00 protocol, and transmits it as the third type optical signal (cryptographic signal). In this way, the optical transmission device 1 can simultaneously transmit the transmission data provided from the n transmission data provision units 11-1 to 11-$n$ as the third type optical signal (cryptographic signal). In other words, the optical transmission device 1 can improve the transmission/reception equipment and transmission efficiency per hour of the transmission data after encryption in the physical layer. Further, the basic optical transmission device 4 in FIG. 4 includes the n encryption units 412-1 to 412-$n$, but the optical transmission device 1 in FIG. 5 is sufficient as long as including one encryption unit 113. In other words, since the modulation is performed into a very large number of multi-levels compared to multi-level modulation performed for a normal purpose (a purpose other than encryption), only one encryption unit 113, which is large in manufacturing costs and size, is sufficient. Therefore, the overall manufacturing costs and size of the optical transmission device 1 are reduced compared to the basic optical transmission device 4.

Next, a detailed description will be given with respect to the amount of time width to be delayed by the delay units DE-1 to DE-n and the delay units DO-1 to DO-n described above.

As described above, the optical transmission device 1 in FIG. 5 includes the delay units DE-1 to DE-n, the encryption units 113, and the delay units DO-1 to DO-n to collectively encrypt the n optical signals to turn the signals into cryptographic signals. Here, the time widths delayed by the delay units DE-1 to DE-n and the delay units DO-1 to DO-n are determined as follows. In other words, the n first type optical signals output (provided) from the delay units DO-1 to DO-n are delayed so as to be provided to the multiplexer 112 at the same timing.

First, the amount of delay in the delay units DE-1 to DE-n will be described. For ease of understanding, the amount of delay in the delay units DE-1 and DE-n will be described below as an example. Specifically, for example, it is assumed that the respective units of the optical transmission device 1 are mounted on the same substrate in the arrangement shown in the example of FIG. 5. In this case, the E/O conversion unit 121-1 is physically close to the clock provision unit 15, and the E/O conversion unit 121-$n$ is physically far from the clock provision unit 15.

In other words, when the delay units DE-1 and DE-n having a time width to be delayed of 0 (zero) are employed, the clock signal provided from the clock provision unit 15 reaches the E/O conversion unit 121-1 early and reaches the E/O conversion unit 121-$n$ later. As a result, the first type optical signal output from the E/O conversion unit 121-1 and the first type optical signal output from the E/O conversion unit 121-$n$ are output at different timings.

Therefore, the time widths delayed by the delay units DE-1 and DE-n are adjusted such that the first type optical signal output from the E/O conversion unit 121-1 and the first type optical signal output from the E/O conversion unit 121-$n$ are output at the same timing. Similarly, the time widths delayed by the delay units DE-1 to DE-n are adjusted such that the first type optical signals are output from the E/O conversion units 121-1 to 121-$n$ at the same timing.

Next, the amount of delay in the delay units DO-1 to DO-n will be described. For ease of understanding, the amount of delay in the delay units DO-1 and DO-2 will be described below as an example. Specifically, for example, it is assumed that the respective units of the optical transmission device 1 are mounted on the same substrate in the arrangement shown in the example of FIG. 5. In this case, the E/O conversion unit 121-1 is physically far from the multiplexer 112, and the E/O conversion unit 121-2 is physically close to the multiplexer 112.

In other words, when the delay units DO-1 and DO-2 having a time width to be delayed of 0 (zero) are employed, the first type optical signal output from the E/O conversion unit 121-1 reaches the multiplexer 112 later, and the first type optical signal output from the E/O conversion unit 121-2 reaches the multiplexer 112 early. As a result, the first type optical signal output from the E/O conversion unit 121-1 and the first type optical signal output from the E/O conversion unit 121-2 are input (provided) to the multiplexer 112 at different timings.

Therefore, the time widths delayed by the delay units DO-1 and DO-2 are adjusted such that the first type optical signals output from the E/O conversion unit 121-1 and the E/O conversion unit 121-2 are input (provided) to the multiplexer 112 at the same timing. Similarly, the time widths delayed by the delay units DO-1 to DO-n are adjusted such that the first type optical signals output from the E/O conversion unit 121-1 and the E/O conversion unit 121-$n$ are input (provided) to the multiplexer 112 at the same timing.

The time widths delayed by the delay units DE-1 to DE-n and the delay units DO-1 to DO-n are merely examples. In other words, it is sufficient when the timing at which each of the n first type optical signals is input to the multiplexer 112 is delayed based on the timing modulated by the encryption unit 113. Specifically, for example, the time widths delayed by the delay unit DE-k and the delay unit DO-k may be set in any combination such that the n first type optical signals are input to the multiplexer 112 at the same timing. Specifically, for example, in the optical transmission device 1, when the time width delayed by the delay unit DE-k is $t1\text{-}k$ and the time width delayed by the delay unit DO-k is $t2\text{-}k$, it is assumed that the n first type optical signals are input (provided) to the multiplexer 112 at the same timing. At this time, even when the time width delayed by the delay unit DE-k is set to 0 (zero) and the time width delayed by the delay unit DO-k is set to $(t1\text{-}k)+(t2\text{-}k)$, the n first type optical signals are input (provided) to the multiplexer 112 at the same timing.

The description has been given above with reference to FIG. 5 with respect to a detailed configuration example of the optical transmission device 1 according to one embodiment of the present invention which is developed from the basic optical transmission device 4 shown in FIG. 4. A description will be given below with reference to FIGS. 6 to 10 with respect to detailed configuration examples of the E/O conversion unit 121-$k$ and the encryption unit 113 in the optical transmission device 1 of FIG. 5, that is, configuration examples related to modulation.

Figure 6:
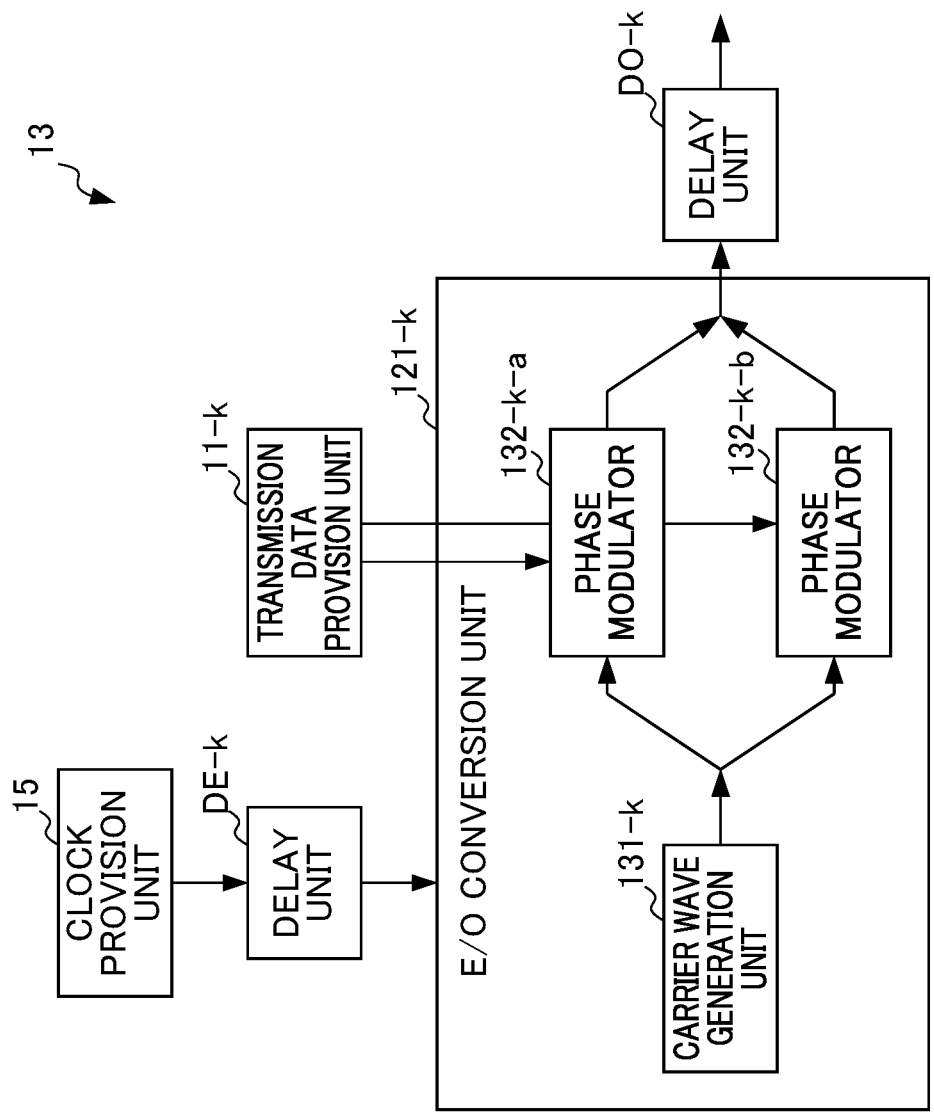
FIG. 6 is a block diagram showing a detailed configuration example related to the output of an optical signal of any one wavelength among the configurations related to the output of the optical signals of a plurality of wavelengths included in the optical transmission device in FIG. 5

FIG. 6 is a block diagram showing a detailed configuration example related to the output of an optical signal of any one wavelength among the configurations related to the output of the optical signals of a plurality of wavelengths included in the optical transmission device in FIG. 5. In other words, FIG. 6 shows a configuration example of the E/O conversion unit 121-$k$ suitable for employing phase modulation or intensity modulation as optical signal modulation of using the Y-00 protocol. Functions of the transmission data provision unit 11-$k$, the clock provision unit 15, the delay unit DE-k, the E/O conversion unit 121-$k$, and the delay unit DO-k in the example of FIG. 6 are the same as those described with reference to FIGS. 1 and 5.

In the example of FIG. 6, the E/O conversion unit 121-$k$ includes a carrier wave generation unit 131-$k$ and phase modulators 132-$k$-$a$ and 132-$k$-$b$. Further, the phase modulators 132-$k$-$a$ and 132-$k$-$b$ have a structure of an interferometer. In other words, the phase modulators 132-$k$-$a$ and 132-$k$-$b$ constitute a Mach-Zehnder modulator.

Here, the Mach-Zehnder modulator is a modulator that uses a principle of a Mach-Zehnder interferometer. A signal path of the optical signal is branched into two signal paths. Phase modulation elements (phase modulator 132-$k$-$a$ and 132-$k$-$b$ in the example of FIG. 6), are respectively arranged in each of the signal paths. Thus, two optical signals, which have passed through the two phase modulators, respectively, are output after mutual interference. The Mach-Zehnder modulator having the configuration in FIG. 6 is merely an example. In other words, a phase modulator is provided in one or both of the branched signal paths, and can be used as a Mach-Zehnder interferometer.

As described with reference to FIG. 1, the transmission data provision unit 11-$k$ generates plaintext data (transmission data) to be transmitted or acquires the plaintext data from a generation source (not shown), and provides the data as transmission data to the cryptographic signal generation unit 13.

The carrier wave generation unit 131-$k$ generates an optical signal with a predetermined wavelength as a carrier wave. Here, based on the transmission data provided from the transmission data provision unit 11-$k$, a voltage to be applied to each of the phase modulators 132-$k$-$a$ and 132-$k$-$b$ is determined. Then, a digital value corresponding to the voltage is output, and analog voltages corresponding to the digital values are applied to the phase modulators 132-$k$-$a$ and 132-$k$-$b$, respectively, via a digital-to-analog converter (hereinafter, abbreviated as "DAC") (not shown). As a result, the two optical signals are modulated in the phase modulators 132-$k$-$a$ and 132-$k$-$b$ by phases corresponding to the voltages, respectively. Thus, the first type optical signal corresponding to the transmission data provided from the transmission data provision unit 11-$k$ is output from the E/O conversion unit 121-$k$. At this time, as described with reference to FIG. 5, each of the phase modulators 132-$k$-$a$ and 132-$k$-$b$ modulates the first type optical signal at the timing based on the clock signal provided from the clock provision unit 15 via the delay unit DE-k, and outputs the modulated signal.

The delay unit DO-k delays the first type optical signal output from the E/O conversion unit 121-$k$ by a predetermined time width, as described with reference to FIG. 5. The first type optical signal delayed by the predetermined time width in the delay unit DO-k is input (provided) to the multiplexer 112 (not shown), and then becomes a third type optical signal (cryptographic signal) as described with reference to FIG. 5.

Figure 7:
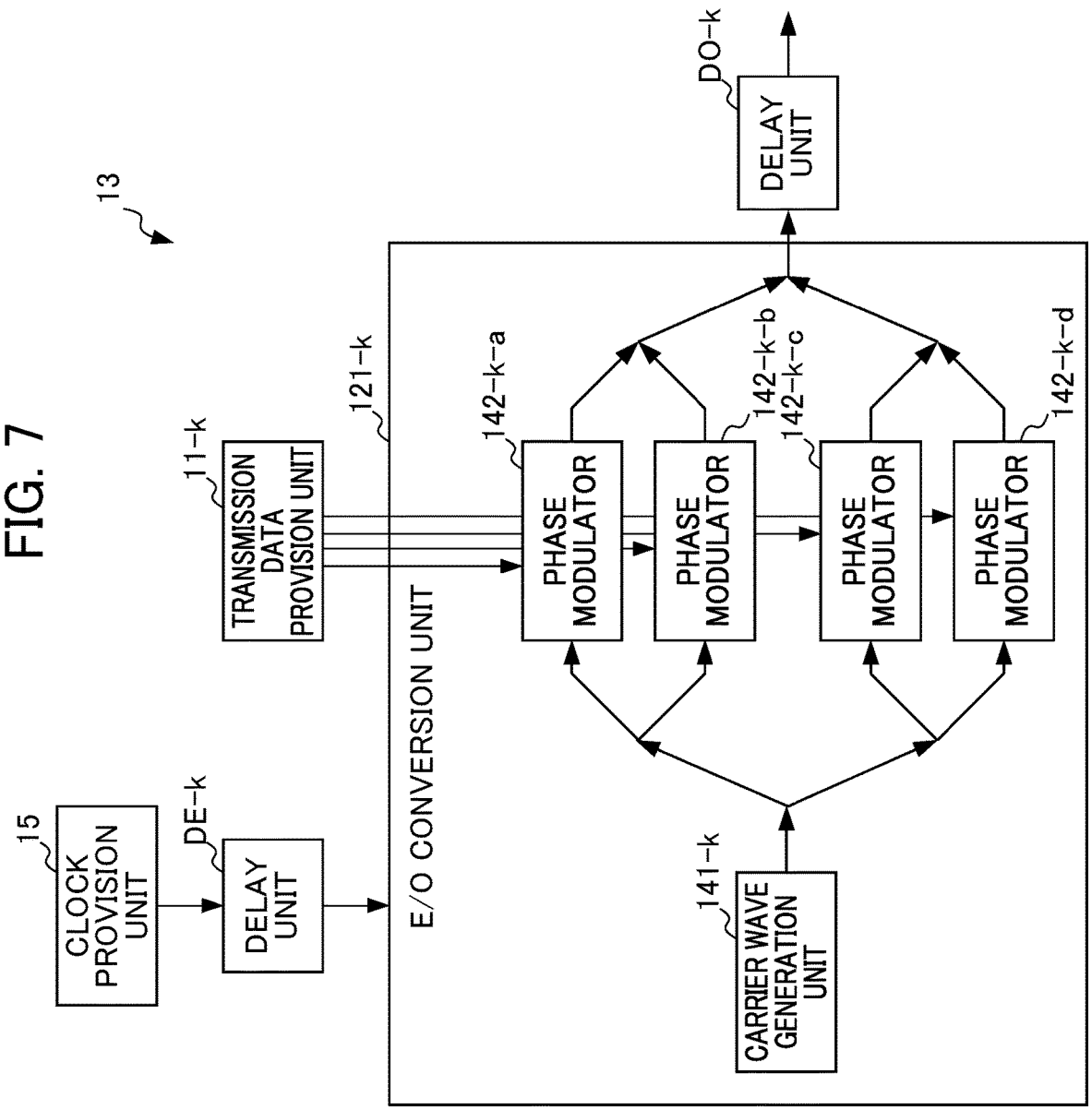
FIG. 7 is a block diagram, which is different from FIG. 6, showing a detailed configuration example related to the output of an optical signal of any one wavelength among the configurations related to the output of the optical signals of a plurality of wavelengths included in the optical transmission device in FIG. 5.

FIG. 7 is a block diagram, which is different from FIG. 6, showing a detailed configuration example related to the output of an optical signal of any one wavelength among the configurations related to the output of the optical signals of a plurality of wavelengths included in the optical transmission device in FIG. 5. In other words, FIG. 7 shows a configuration example of the E/O conversion unit 121-$k$ suitable for employing multi-level phase modulation or quadrature amplitude modulation as optical signal modulation using the Y-00 protocol. The multi-level phase modulation is phase modulation that employs a modulation number greater than a binary value. In other words, QPSK (Quadrature Phase Shift Keying) and 8 PSK (8-Phase Shift Keying) are examples of multi-level phase modulation. Functions of the transmission data provision unit 11-$k$, the clock provision unit 15, the delay unit DE-k, the E/O conversion unit 121-$k$, and the delay unit DO-k in the example of FIG. 7 are the same as those described with reference to FIGS. 1 and 5.

In the example of FIG. 7, the E/O conversion unit 121-$k$ includes a carrier wave generation unit 141-$k$ and phase modulators 142-$k$-$a$ to 142-$k$-$d$. Further, the phase modulators 142-$k$-$a$ to 132-$k$-$d$ have a structure of an interferometer. In other words, the phase modulators 142-$k$-$a$ to 142-$k$-$d$ constitute an IQ modulator.

Here, the IQ modulator is a modulator as follows. In other words, the IQ modulator is a modulator in which two Mach-Zehnder interferometers are further constituted as an interferometer configuration, the input optical signal is branched into four signal paths, and the optical signals, which have passed through the four signal paths, respectively, are output after mutual interference. At this time, light can be generated at any point in an IQ plane (that is, any amplitude and phase) through phase modulation elements (two phase modulators 142-$k$-$a$ and 142-$k$-$c$ in the example of FIG. 7) in at least two or more signal paths selected from the branched signal paths.

The transmission data provision unit 11-$k$ generates plaintext data (transmission data) to be transmitted or acquires the plaintext data from a generation source (not shown), and provides the data as transmission data to the cryptographic signal generation unit 13, as described with reference to FIG. 1.

The carrier wave generation unit 141-$k$ has basically the same function as the carrier wave generation unit 131-$k$ as described above with reference to FIG. 6. In other words, the carrier wave generation unit 141-$k$ generates an optical signal with a predetermined wavelength as a carrier wave. Here, as described with reference to FIG. 6, based on the transmission data provided from the transmission data provision unit 11-$k$, a voltage to be applied to each of the phase modulators 142-$k$-$a$ to 142-$k$-$d$ is determined. As a result, the first type optical signal corresponding to the transmission data provided from the transmission data provision unit 11-$k$ is output from the E/O conversion unit 121-$k$. At this time, as described with reference to FIG. 5, each of the phase modulators 142-$k$-$a$ to 142-$k$-$d$ modulates the first type optical signal at the timing based on the clock signal provided from the clock provision unit 15 via the delay unit DE-k, and outputs the modulated signal.

The delay unit DO-k delays the first type optical signal output from the E/O conversion unit 121-k by a predetermined time width, as described with reference to FIG. 5. The first type optical signal delayed by the predetermined time width in the delay unit DO-k is input (provided) to the multiplexer 112 (not shown), and then becomes a third type optical signal (cryptographic signal) as described with reference to FIG. 5.

Figure 8:
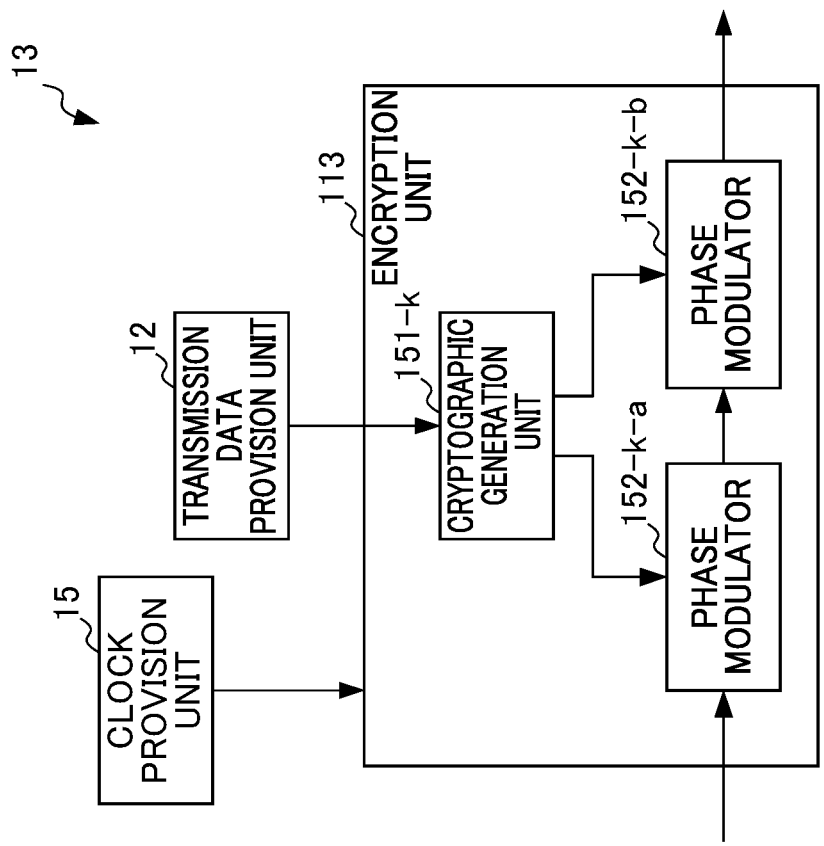
FIG. 8 is a block diagram showing a detailed configuration example related to encryption of a wavelength-multiplexed optical signal in the configuration of the optical transmission device in FIG. 5.

FIG. 8 is a block diagram showing a detailed configuration example related to encryption of a wavelength-multiplexed optical signal in the configuration of the optical transmission device in FIG. 5. In other words, FIG. 8 shows a configuration example of the encryption unit 113 suitable for employing phase modulation as optical signal modulation using the Y-00 protocol. Functions of the cryptographic key provision unit 12, the clock provision unit 15, and the encryption unit 113 in the example of FIG. 8 are the same as those described with reference to FIGS. 1 and 5.

In the example of FIG. 8, the encryption unit 113 includes a cryptographic generation unit 151-k and phase modulators 152-k-a and 152-k-b. Further, the phase modulators 152-k-a and 152-k-b are arranged in series in a signal path of the optical signal. In other words, the phase modulators 152-k-a and 152-k-b constitute a two-stage phase modulator in series.

Here, similarly to the transmission data provision unit 11-k described above with reference to FIG. 6, the cryptographic generation unit 151-k determines a voltage to be applied to the phase modulator, and outputs a digital value corresponding to the voltage. Then, an analog voltage corresponding to the digital value is applied to the phase modulator via a DAC (not shown). As a result, the optical signal is modulated in the phase modulator by a phase corresponding to the voltage. Incidentally, as described above, a modulation number M is important to ensure the security of the Y-00 cipher. However, when modulation is performed using one DAC which is available at present, there will be limitations placed on the modulation number M due to the output voltage resolution of the DAC. More specifically, there is a strong trade-off between output voltage resolution and modulation bandwidth (speed), and DACs that are available at present have 1024 levels for modulation at 10 Gbit/s. In other words, in a case where something put into practical use at present at the time of filing of the present application is employed as a DAC, when the encryption unit 113 is used to perform modulation using one DAC, it is difficult to realize 4096 as the modulation number M in modulation at 10 Gbit/s. Conversely, in a case where something put into practical use at present at the time of filing of the present application is employed, it will be necessary to decrease the transfer speed from 10 Gbit/s in order to achieve having 4096 as the modulation number M. Furthermore, in order to further ensure high security, the modulation number M is required to be approximately 10,000. Therefore, in the example of FIG. 8, the encryption unit 113 includes the two-stage of phase modulator in series.

In other words, the inventors devised a technique of performing modulation (at least one of phase modulation and amplitude modulation) of light in two stages, specifically, for example, a technique of decomposing the modulation number M (=M1×M2), performing a first stage modulation once with the modulation number M1, and subsequently performing a second stage modulation with the modulation number M2. Hereinafter, the first stage modulation is referred to as "coarse modulation" and the second stage modulation is appropriately referred to as "fine modulation". Note that the number of stages of modulation is not limited to two stages, but can be extended to j stages (where j is an integer value of 2 or more). In other words, the inventors devised a technique for modulating light in j stages (at least one of phase modulation and amplitude modulation) of light, for example, a technique for decomposing the modulation number M to have M=M1×M2 x . . . x Mj, performing a first type of optical modulation once with the modulation number M1, and subsequently performing a second type of optical modulation (j-1) times corresponding to the modulation numbers M2 through Mj.

In other words, in the example of FIG. 8, the encryption unit 113 includes a phase modulator 152-k-a for coarse modulation and a phase modulator 152-k-b for fine modulation.

The cryptographic key provision unit 12 provides the encryption unit 113 with the cryptographic key used for encryption in the cryptographic generation unit 151-k, as described with reference to FIG. 1. The clock provision unit 15 provides a clock signal for modulation in the encryption unit 113, as described with reference to FIG. 1.

The cryptographic generation unit 151-k in the example of FIG. 8 uses the cryptographic key provided from the cryptographic key provision unit 12 to generate a very large number of multi-level data. In other words, for example, when binary information (1 bit) per wavelength is transmitted at the same time, the cryptographic generation unit 151-k generates multi-level data with a modulation number M/2. As a result, the modulation is performed by binary data (1 bit) of the transmission data and the multi-level data of the modulation number M/2 for encryption, and the modulation number M is finally achieved.

Here, based on the multi-level data of the modulation number M/2 for encryption generated by the cryptographic generation unit 151-k, voltages respectively applied to the phase modulator 152-k-a for coarse modulation and the phase modulator 152-k-b for fine modulation are determined. Then, digital data corresponding to such a voltage is output, and analog voltages are applied to the phase modulators 152-k-a and 152-k-b via a DAC (not shown), respectively. As a result, two optical signal are modulated in the phase modulators 152-k-a and 152-k-b, respectively, by a phase corresponding to each of such voltages. Thus, using one wavelength-multiplexed second type optical signal as an input, the third type optical signal modulated with a very large number of multi-levels as the modulation number M, for each wavelength is output from the encryption unit 113. At this time, as described with reference to FIG. 5, each of the phase modulators 152-k-a and 152-k-b modulates at the timing based on the clock signal provided from the clock provision unit 15, and outputs the third type optical signal.

With such a configuration of the encryption unit 113, the third type optical signal (cryptographic signal) modulated with a very large number of multi-levels as the modulation number M=4096, is output.

Figure 9:
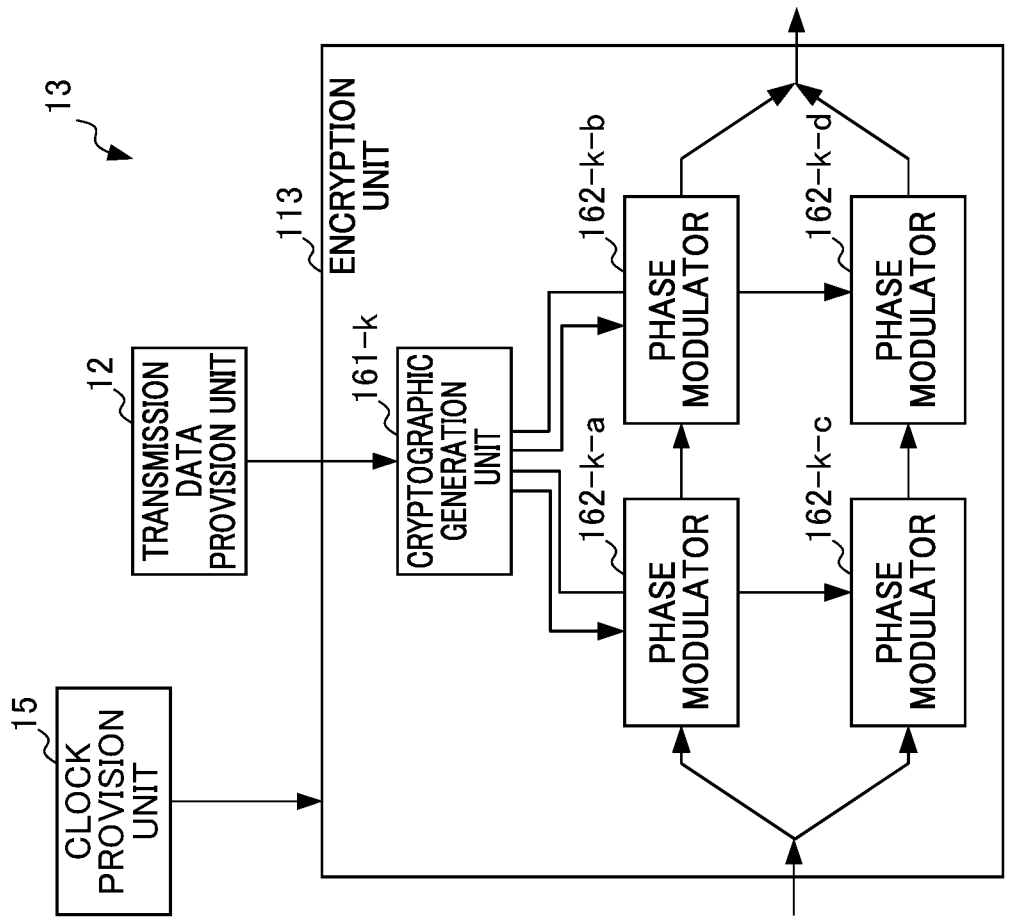
FIG. 9 is a block diagram, which is different from FIG. 8, showing a detailed configuration example related to encryption of a wavelength-multiplexed optical signal in the configuration of the optical transmission device in FIG. 5.

FIG. 9 is a block diagram, which is different from FIG. 8, showing a detailed configuration example related to encryption of a wavelength-multiplexed optical signal in the configuration of the optical transmission device in FIG. 5. In other words, FIG. 9 shows a configuration example of the encryption unit 113 suitable for employing intensity modulation as optical signal modulation using the Y-00 protocol. Functions of the cryptographic key provision unit 12, the clock provision unit 15, and the encryption unit 113 in the example of FIG. 9 are the same as those described with reference to FIGS. 1 and 5.

In the example of FIG. 9, the encryption unit 113 includes a cryptographic generation unit 161-k and phase modulators 162-$k$-$a$ to 162-$k$-$d$. The phase modulator in the example of FIG. 9 constitutes a two-stage phase modulator of a phase modulator for coarse modulation and a phase modulator for fine modulation in series in the Mach-Zehnder modulator described with reference to FIG. 6.

In other words, in the example of FIG. 9, the encryption unit 113 includes phase modulators 162-$k$-$a$ and 162-$k$-$c$ for coarse modulation and phase modulators 162-$k$-$b$ and 162-$k$-$d$ for fine modulation.

The cryptographic key provision unit 12 provides the encryption unit 113 with the cryptographic key used for encryption in the cryptographic generation unit 161-$k$, as described with reference to FIG. 1. The clock provision unit 15 provides a clock signal for modulation in the encryption unit 113, as described with reference to FIG. 1.

The cryptographic generation unit 161-$k$ in the example of FIG. 9 uses the cryptographic key provided from the cryptographic key provision unit 12 to generate a very large number of multi-level data. In other words, for example, when binary information (1 bit) per wavelength is transmitted at the same time, the cryptographic generation unit 161-$k$ generates multi-level data with a modulation number M/2. As a result, the modulation is performed by binary data (1 bit) of the transmission data and the multi-level data of the modulation number M/2 for encryption, and the modulation number M is finally achieved.

Here, based on the multi-level data of the modulation number M/2 for encryption generated by the cryptographic generation unit 161-$k$, voltages respectively applied to each of the phase modulators 162-$k$-$a$ to 162-$k$-$d$ for coarse modulation and fine modulation are determined. Thus, using one wavelength-multiplexed second type optical signal as an input, the third type optical signal modulated with a very large number of multi-levels as the modulation number M, for each wavelength is output from the encryption unit 113. At this time, as described with reference to FIG. 5, each of the phase modulators 162-$k$-$a$ to 162-$k$-$d$ modulates at the timing based on the clock signal provided from the clock provision unit 15, and outputs the third type optical signal.

With such a configuration of the encryption unit 113, the third type optical signal (cryptographic signal) modulated with a very large number of multi-levels as the modulation number M=4096, is output.

Figure 10:
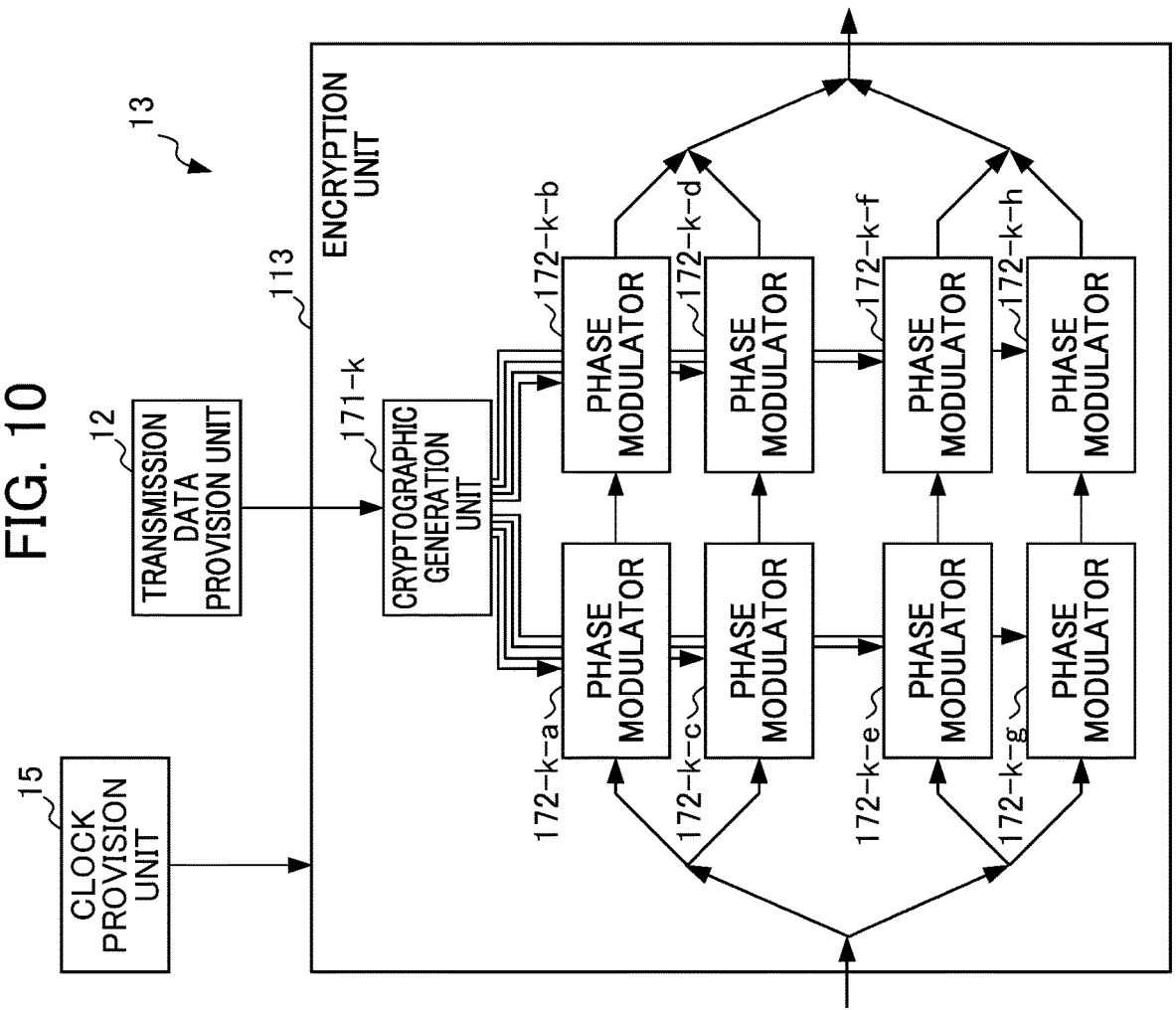
FIG. 10 is a block diagram, which is different from FIGS. 8 and 9, showing a detailed configuration example related to encryption of a wavelength-multiplexed optical signal in the configuration of the optical transmission device in FIG. 5.

FIG. 10 is a block diagram, which is different from FIGS. 8 and 9, showing a detailed configuration example related to encryption of a wavelength-multiplexed optical signal in the configuration of the optical transmission device in FIG. 5. In other words, FIG. 10 shows a configuration example of the encryption unit 113 suitable for employing quadrature amplitude modulation as optical signal modulation using the Y-00 protocol. Functions of the cryptographic key provision unit 12, the clock provision unit 15, and the encryption unit 113 in the example of FIG. 10 are the same as those described with reference to FIGS. 1 and 5.

In the example of FIG. 10, the encryption unit 113 includes a cryptographic generation unit 171-$k$ and phase modulators 172-$k$-$a$ to 172-$k$-$h$. The phase modulator in the example of FIG. 10 constitutes a two-stage phase modulator of a phase modulator for coarse modulation and a phase modulator for fine modulation in series in the IQ modulator described with reference to FIG. 6.

In other words, in the example of FIG. 10, the encryption unit 113 includes phase modulators 172-$k$-$a$, 172-$k$-$c$, 172-$k$-$e$, and 172-$k$-$g$ for coarse modulation and phase modulators 172-$k$-$b$, 172-$k$-$d$, 172-$k$-$f$, and 172-$k$-$h$ for fine modulation.

The cryptographic key provision unit 12 provides the encryption unit 113 with the cryptographic key used for encryption in the cryptographic generation unit 171-$k$, as described with reference to FIG. 1. The clock provision unit 15 provides a clock signal for modulation in the encryption unit 113, as described with reference to FIG. 1.

The cryptographic generation unit 171-$k$ in the example of FIG. 10 uses the cryptographic key provided from the cryptographic key provision unit 12 to generate a very large number of multi-level data. In other words, for example, when binary information (1 bit) per wavelength is transmitted at the same time, the cryptographic generation unit 171-$k$ generates multi-level data with the modulation number M/2 for each quadrature amplitude. As a result, the modulation is performed by binary data (1 bit) of the transmission data and the multi-level data of the modulation number M/2 for encryption, and the modulation number M is finally achieved for each quadrature amplitude.

Here, based on the multi-level data of the modulation number M/2 for encryption generated by the cryptographic generation unit 171-$k$, voltages respectively applied to each of the phase modulators 172-$k$-$a$ to 172-$k$-$h$ for coarse modulation and fine modulation are determined. Thus, using one wavelength-multiplexed second type optical signal as an input, the third type optical signal modulated with a very large number of multi-levels as the modulation number M, for each wavelength is output from the encryption unit 113. At this time, as described with reference to FIG. 5, each of the phase modulators 172-$k$-$a$ to 172-$k$-$h$ modulates at the timing based on the clock signal provided from the clock provision unit 15, and outputs the third type optical signal.

With such a configuration of the encryption unit 113, the third type optical signal (cryptographic signal) modulated with a very large number of multi-levels as the modulation number M=4096, is output.

To summarize the above, when the phase modulation, the intensity modulation, or the quadrature amplitude modulation is employed as the modulation of optical signal using the Y-00 protocol, it is preferable to employ the optical transmission device 1 configured as follows.

When the phase modulation is employed as the modulation of optical signal using the Y-00 protocol, it is preferable to employ the optical transmission device 1 configured as follows. In other words, it is preferable to configure the optical transmission device 1 in combination of the detailed configuration example related to the output of the optical signal to be output to the multiplexer shown in FIG. 6 or 7 and the detailed configuration example related to the encryption of the wavelength-multiplexed optical signal shown in FIG. 8. In other words, the optical transmission device 1 having such a configuration outputs the n first type optical signal from the E/O conversion unit 121-$k$ including the Mach-Zehnder modulator or the IQ modulator, and turns the signals into one second type optical signal which is wavelength-multiplexed in the multiplexer 112. Then, the optical transmission device 1 modulates the second type optical signal into a multi-level, based on the algorithm for Y-00 protocol, by constituting the two-stage phase modulator for coarse modulation and fine modulation in series, and transmits it as the third type optical signal (cryptographic signal).

Further, when the intensity modulation is employed as the modulation of optical signal using the Y-00 protocol, it is preferable to employ the optical transmission device 1 configured as follows. In other words, it is preferable to configure the optical transmission device 1 in combination of the detailed configuration example related to the output of the optical signal to be output to the multiplexer shown in FIG. 6 and the detailed configuration example related to the encryption of the wavelength-multiplexed optical signal shown in FIG. 9. In other words, the optical transmission device 1 having such a configuration outputs the n first type optical signal from the E/O conversion unit 121-$k$ including the Mach-Zehnder modulator, and turns the signals into one second type optical signal which is wavelength-multiplexed in the multiplexer 112. Then, the optical transmission device 1 modulates the second type optical signal into a multi-level, based on the algorithm for Y-00 protocol, by constituting the two-stage phase modulator for coarse modulation and fine modulation in series in the Mach-Zehnder modulator, and transmits it as the third type optical signal (cryptographic signal).

Further, when the quadrature amplitude modulation is employed as the modulation of optical signal using the Y-00 protocol, it is preferable to employ the optical transmission device 1 configured as follows. In other words, it is preferable to configure the optical transmission device 1 in combination of the detailed configuration example related to the output of the optical signal to be output to the multiplexer shown in FIG. 7 and the detailed configuration example related to the encryption of the wavelength-multiplexed optical signal shown in FIG. 10. In other words, the optical transmission device 1 having such a configuration outputs the n first type optical signal from the E/O conversion unit 121-$k$ including the IQ modulator, and turns the signals into one second type optical signal which is wavelength-multiplexed in the multiplexer 112. Then, the optical transmission device 1 modulates the second type optical signal into a multi-level, based on the algorithm for Y-00 protocol, by constituting the two-stage phase modulator for coarse modulation and fine modulation in series in the IQ modulator, and transmits it as the third type optical signal (cryptographic signal).

The description has been given above with reference to FIGS. 6 to 10 with respect to the detailed configuration example of the E/O conversion unit 121-$k$ and the encryption unit 113 in the optical transmission device 1 of FIG. 5, that is, the configuration example related to modulation. A description will be given below with reference to FIGS. 11 and 12 with respect to a configuration example of the optical reception device related to reception of the third type optical signal.

Figure 11:
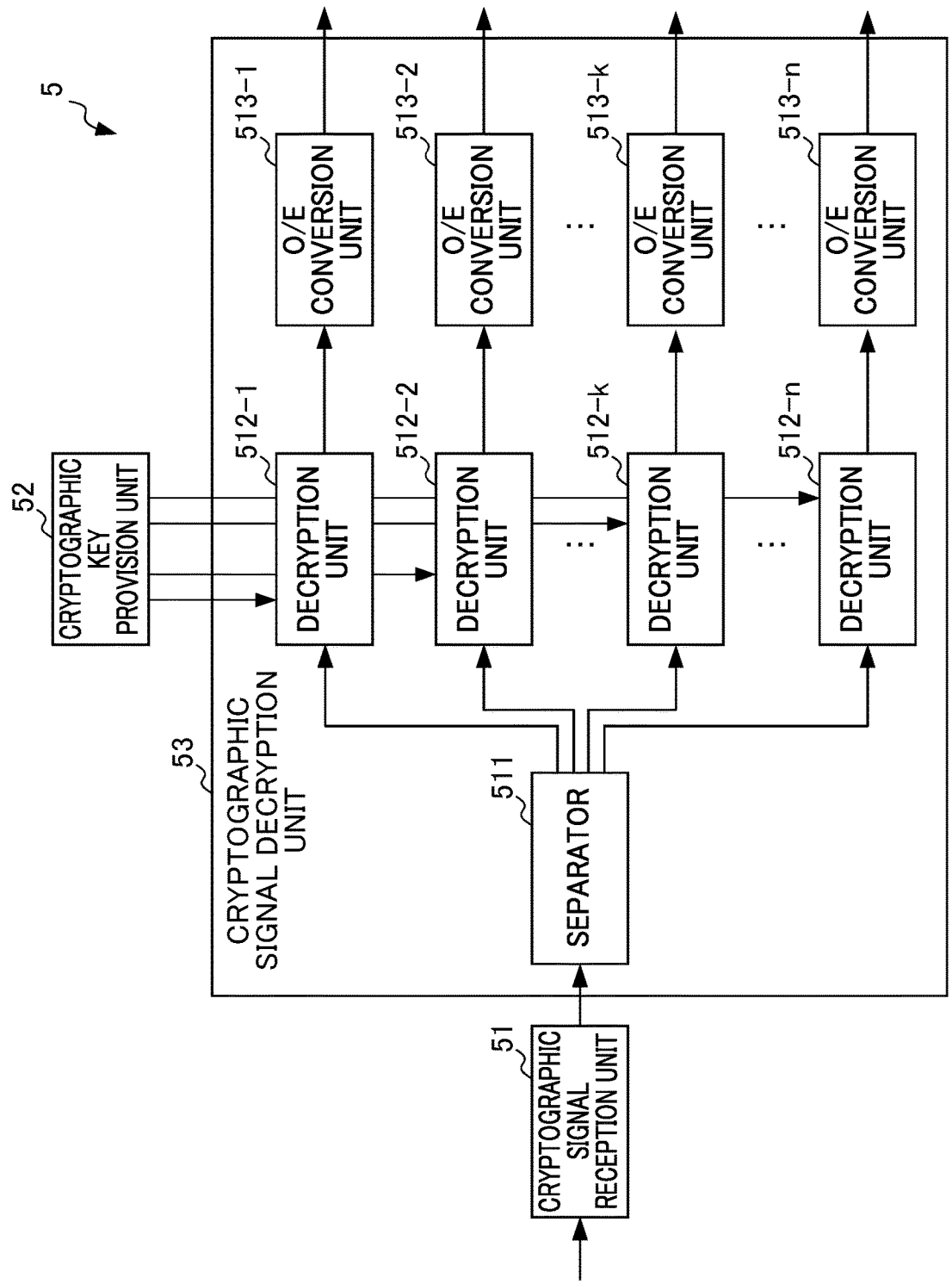
FIG. 11 is a block diagram showing a detailed configuration example of an optical reception device that forms the basis of the optical reception device shown in FIG. 1.

FIG. 11 is a block diagram showing a detailed configuration example of an optical reception device that forms the basis of the optical reception device shown in FIG. 1. An optical reception device 5 (hereinafter, referred to as a "basic optical reception device 5") to be the basis shown in FIG. 11 basically has the same configuration as the optical reception device 2 shown in FIG. 1. Specifically, the basic optical reception device 5 includes a cryptographic signal reception unit 51, a cryptographic key provision unit 52, and a cryptographic signal decryption unit 53. Further, the cryptographic signal reception unit 51, the cryptographic key provision unit 52, and the cryptographic signal decryption unit 53 basically have the same functions as the cryptographic signal reception unit 21, the cryptographic key provision unit 22, and the cryptographic signal decryption unit 23, respectively. As a result, the basic optical reception device 5 receives the cryptographic signal transmitted from the optical transmission device 1 or the basic optical transmission device 4, and decrypts the transmission data in the optical transmission device 1 or the basic optical transmission device 4.

FIG. 11 shows a detailed configuration example of the basic optical reception device 5. The cryptographic signal decryption unit 53 of the basic optical reception device 5 in the example of FIG. 11 includes a separator 511, decryption units 512-1 to 512-$n$, and O/E conversion units 513-1 to 513-$n$. Here, as shown in FIG. 11, each of the decryption units 512-1 to 512-$n$ basically has the same configuration, and each of the O/E conversion units 513-1 to 513-$n$ basically has the same configuration. Therefore, a description will be given below with reference to FIG. 11 with respect to signal processing in a decryption unit 512-$k$ and an O/E conversion unit 513-$k$.

The cryptographic signal reception unit 51 receives the wavelength-multiplexed cryptographic signal, amplifies the signal as necessary, and then provides the signal to the cryptographic signal decryption unit 53 as an optical signal. In other words, the third type optical signal transmitted by the optical transmission device 1 becomes an optical signal, which is amplified as necessary, in the cryptographic signal reception unit 51.

The cryptographic key provision unit 52 provides the cryptographic signal decryption unit 53 with a cryptographic key used when the cryptographic signal is decrypted.

The separator 511 separates the optical signal, which is amplified as necessary, into n optical signals. In other words, the optical signal amplified as necessary is separated by the separator 511 for each of wavelength components in the optical signal amplified as necessary, and thus is separated into n optical signals having different wavelengths.

The decryption unit 512-$k$ modulates the optical signal (cryptographic signal) of a certain wavelength provided from the separator 511 using the cryptographic key provided from the cryptographic key provision unit 52, and thus decrypts the signal. In other words, the optical signal (cryptographic signal) of a certain wavelength provided from the separator 511 is modulated by the decryption unit 512-$k$, and becomes a decrypted optical signal.

The O/E conversion unit 513-$k$ converts the optical signal decrypted by the decryption unit 512-$k$ into an electrical signal. In other words, the optical signal decrypted by the decryption unit 512-$k$ is converted from an optical signal to an electrical signal by the O/E conversion unit 513-$k$, and becomes the decrypted electrical signal (corresponding to transmission data).

In this way, the basic optical reception device 5 can receive and decrypt the multiplexed cryptographic signal transmitted from the optical transmission device 1 or the basic optical transmission device 4, and thus can generate the electrical signal corresponding to transmission data. In other words, n cryptographic signals based on n pieces of multiplexed transmission data can be simultaneously received through one optical fiber. In other words, the transmission/reception equipment and transmission efficiency per hour of the transmission data is improved.

Here, the basic optical reception device 5 shown in FIG. 11 includes n decryption units 512-1 to 512-$n$ having the same number as the number of pieces of transmission data. In other words, the basic optical reception device 5 needs to include n decryption units 512-1 to 512-$n$ having the same number as the number of pieces of transmission data.

However, since each of the decryption units 512-1 to 512-$n$ modulates a signal into a very large number of multi-levels compared to multi-level modulation performed for a normal purpose (a purpose other than encryption), manufacturing costs and a size increase. Therefore, there is a problem that the overall manufacturing costs and size of the basic optical reception device 5 increase according to the number of multiplexed wavelengths.

The decryption unit 512-$k$ and the O/E conversion unit 513-$k$ are not limited to the configurations described above, and may have the following configuration. In other words, although not shown, the optical signal (cryptographic signal) of a certain wavelength provided from the separator 511 is converted into the electrical signal (cipher data) encrypted by the O/E conversion unit, the electrical signal is decrypted as processing for the electrical signal, and thus the decrypted electrical signal can also be generated. Similarly to the basic optical reception device 5 having the configuration shown in FIG. 11, the basic optical reception device 5 having such a configuration also includes n decryption units. In other words, the basic optical reception device 5 having such a configuration includes n decryption units, which decrypts the electrical signal (cipher data), as processing for the electrical signal. Therefore, there is a problem that the overall manufacturing costs and size of the basic optical reception device 5 increase according to the number of multiplexed wavelengths. Therefore, the optical reception device 2 according to the embodiment of the present invention has a configuration capable of preventing an increase in the overall manufacturing costs and size of the optical reception device 2 according to the number of multiplexed wavelengths.

Figure 12:
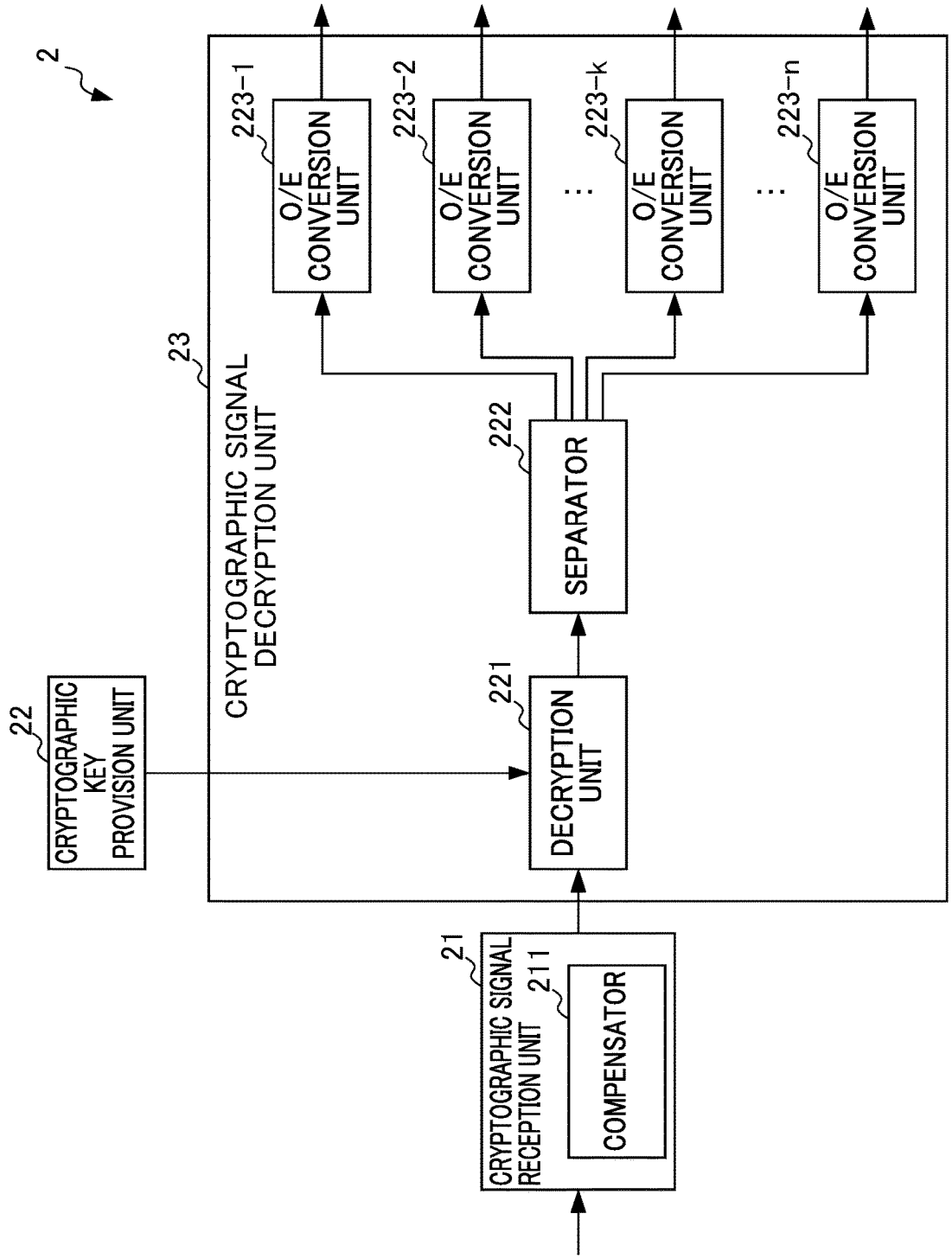
FIG. 12 is a block diagram showing a detailed configuration example of the optical reception device shown in FIG. 1.

A description will be given below with reference to FIG. 12 with respect to a detailed configuration example of the optical reception device according to the embodiment of the present invention which is developed from the basic optical reception device 5 shown in FIG. 11. FIG. 12 is a block diagram showing a detailed configuration example of the optical reception device shown in FIG. 1. In the example of FIG. 12, the optical reception device 2 includes a cryptographic signal reception unit 21, a cryptographic key provision unit 22, and a cryptographic signal decryption unit 23, as shown in FIG. 1. Here, the cryptographic signal reception unit 21 of the optical reception device 2 in the example of FIG. 12 includes a compensator 211. Further, the cryptographic signal decryption unit 23 of the optical reception device 2 in the example of FIG. 12 includes a decryption unit 221, a separator 222, and O/E conversion units 223-1 to 223-$n$.

The cryptographic signal decryption unit 23 of the optical reception device 2 in the example of FIG. 12 differs from the basic optical reception device 5 in FIG. 11 in the following points. In other words, the basic optical reception device 5 in FIG. 11 decrypts the n optical signals having different wavelengths separated by the separator 511 using the decryption units 512-1 to 512-$k$ to generate the decrypted optical signals. On the other hand, the decryption unit 221 of the optical reception device 2 in the example of FIG. 12 collectively converts one multiplexed optical signal (cryptographic signal) provided from the cryptographic signal reception unit 21 into the decrypted optical signal.

Here, as shown in FIG. 12, each of the O/E conversion units 223-1 to 223-$n$ basically has the same configuration. Therefore, a description will be given below with reference to FIG. 12 with respect to signal processing in an O/E conversion unit 223-$k$.

The cryptographic signal reception unit 21 receives the wavelength-multiplexed cryptographic signal (hereinafter, appropriately referred to as a "fourth type optical signal" to distinguish from other optical signals), amplifies such a signal as necessary, and then provides it to the cryptographic signal decryption unit 23 as an optical signal (hereinafter, appropriately referred to as a "fifth type optical signal" to distinguish from other optical signals). Here, the fourth type optical signal differs from the third type optical signal described above in the following points. In other words, the fourth type optical signal is an optical signal received by the cryptographic signal reception unit 21 after the third type optical signal transmitted by the optical transmission device 1 is transferred through the optical communication cable 3. For this reason, the fourth type optical signal may undergo signal distortion due to attenuation and chromatic dispersion while being transferred through the optical communication cable 3. Further, the fourth type optical signal passes through an amplifier (not shown), which amplifies the attenuated signal intensity, in the middle of the optical communication cable 3, and under the influence of this, may become an optical signal different from the third type optical signal.

In addition, the fifth type optical signal differs from the fourth type optical signal in terms of being amplified and compensated by the cryptographic signal reception unit 21 as necessary. Specifically, the compensator 211 in the cryptographic signal reception unit 21 performs the following compensation.

The compensator 211 compensates for each of delays until each of n wavelength components contained in the fourth type optical signal reaches the optical reception device 2 from the optical transmission device 1 to generate a fifth type optical signal. Here, a refractive index of the optical communication cable 3 depends on a wavelength. In other words, the speed of light (phase speed) in the optical communication cable 3 differs depending on each wavelength of the optical signal. As a result, each of the n wavelength components contained in the wavelength-multiplexed fourth type optical signal is delayed corresponding to each wavelength until reaching the optical reception device 2 from the optical transmission device 1. Thus, each of n wavelength components contained in the fifth type optical signal compensated by the compensator 211 is in a state of not being delayed corresponding to each wavelength until reaching the optical reception device 2 from the optical transmission device 1. Specifically, an example of the compensator 211 includes a compensator using an optical fiber (dispersion compensation optical fiber) or a fiber Bragg grating having a chromatic dispersion characteristic reverse to that of the optical communication cable 3.

The cryptographic key provision unit 22 provides the cryptographic signal decryption unit 23 with the cryptographic key used at the time of decryption of the cryptographic signal.

The decryption unit 221 modulates the fifth type optical signal using the cryptographic key provided from the cryptographic key provision unit 22 based on a decryption algorithm corresponding to the encryption algorithm of the Y-00 protocol, and thus decrypts the signal. In other words, the optical signal provided from the compensator 211 is modulated by the decryption unit 221, and becomes a decrypted optical signal (hereinafter, appropriately referred to as a "sixth type optical signal" to distinguish from other optical signals). In the present embodiment, it can be said that the modulation in the decryption unit 221 of the optical reception device 2 is modulation reverse to the modulation in the encryption unit 113 of the optical transmission device 1. In other words, for example, when the modulation for encryption is modulation in which a phase is advanced by $\pi$, the modulation for decryption is modulation in which a phase is reversed by $\pi$.

As described above, the fifth type optical signal is input (provided) to the decryption unit 221, the fifth type optical signal containing n wavelength components and being compensated by the compensator 211. In other words, the fifth type optical signal is an optical signal with no delay due to the compensator 211. In other words, the modulation for encryption of the optical signal (cryptographic signal) of the n wavelength components contained in the fifth type optical signal is synchronized. Since the modulation for encryption of the optical signal (cryptographic signal) of the n wavelengths contained in the fifth type optical signal is synchronized, decryption can be performed by one decryption unit 221.

The decryption unit 221 is configured by a combination of various modulation elements, and output the sixth type optical signal. Specifically, for example, the decryption unit 221 is configured by one or more modulation elements (for example, a phase modulator, a Mach-Zehnder modulator, and an IQ modulator).

The separator 222 separates the sixth type optical signal into n optical signals (hereinafter, appropriately referred to as a "seventh type optical signal" to distinguish from other optical signals). In other words, the separator 222 separates the sixth type optical signal into n seventh type optical signals having different wavelength by separating each of the wavelength components contained in the sixth type optical signal. As a result, the n seventh type optical signals are provided to the O/E conversion units 223-1 to 223-n, respectively. Specifically, for example, the separator 222 is configured by an array waveguide diffraction grating or an optical filter such as an optical thin film, and includes an optical coupler. When the optical coupler are employed as the separator 222, separation is realized for each wavelength component by simply splitting the power at the optical coupler, and the wavelengths are separated as part of the reception.

The O/E conversion unit 223-k converts the seventh type optical signal provided from the separator 222 into an electrical signal, and outputs the electrical signal. The O/E conversion unit 223-k may be configured by optical members and photodetectors necessary for reception (there may be more than one). Specifically, for example, the O/E conversion unit 223-k may include a photodiode for direct detection. Further, for example, the O/E conversion unit 223-k may include an optical delay circuit and a photodiode related to delayed interference detection for detecting the amplitude and phase of light. Further, for example, the O/E conversion unit 223-k may include a local light source, an optical mixer, and a balance photodiode related to coherent detection for detecting the amplitude and phase of light. The optical electrical signal provided from the O/E conversion unit 223-k is an electrical signal corresponding to the seventh type optical signal that has been decrypted and separated into respective wavelengths. In other words, the optical signal decrypted by the decryption unit 221-k is the decrypted electrical signal, which is the transmission data itself. The decrypted electrical signal may be subjected to various signal processing necessary for correctly demodulating data, for example, noise removal, error correction, and jitter correction.

A description will be given below with reference to FIG. 12 with respect to a detailed configuration example of the optical reception device 2 according to the embodiment of the present invention which is developed from the basic optical reception device 5 shown in FIG. 11. A description will be given below with respect to a configuration example of the decryption unit 221 in the optical reception device 2 of FIG. 12, that is, a configuration example related to modulation.

To summarize the above, when the phase modulation, the intensity modulation, or the quadrature amplitude modulation is employed as the modulation of optical signal using the Y-00 protocol, it is preferable to employ the decryption unit 221 configured as follows.

When the phase modulation is employed as the modulation of optical signal using the Y-00 protocol, it is preferable to employ the decryption unit 221 configured as follows. In other words, it is preferable to have a configuration similar to the detailed configuration example related to encryption of the wavelength-multiplexed optical signal shown in FIG. 8. In other words, the decryption unit 221 having such a configuration modulates the sixth type optical signal, based on the algorithm for Y-00 protocol, by constituting the two-stage phase modulator for coarse modulation and fine modulation in series, and provides it as the seventh type optical signal Further, when the intensity modulation is employed as the modulation of optical signal using the Y-00 protocol, it is preferable to employ the decryption unit 221 configured as follows. In other words, it is preferable to have a configuration similar to the detailed configuration example related to encryption of the wavelength-multiplexed optical signal shown in FIG. 9. In other words, the decryption unit 221 having such a configuration modulates the sixth type optical signal, based on the algorithm for Y-00 protocol, by constituting the two-stage phase modulator for coarse modulation and fine modulation in series in the Mach-Zehnder modulator, and provides it as the seventh type optical signal.

Further, when the quadrature amplitude modulation is employed as the modulation of optical signal using the Y-00 protocol, it is preferable to employ the decryption unit 221 configured as follows. In other words, it is preferable to have a configuration similar to the detailed configuration example related to encryption of the wavelength-multiplexed optical signal shown in FIG. 10. In other words, the decryption unit 221 having such a configuration modulates the sixth type optical signal, based on the algorithm for Y-00 protocol, by constituting the two-stage phase modulator for coarse modulation and fine modulation in series in the IQ modulator, and provides it as the seventh type optical signal. A description has been given above with respect to a configuration example of the decryption unit 221 in the optical reception device 2 of FIG. 12, that is, a configuration example related to modulation.

Various embodiments of the optical transmission device 1 and the optical reception device 2 according to the present invention have been described above. However, the optical transmission device 1 or the optical reception device 2 according to the present invention is sufficient as long as being capable of improving the transmission/reception equipment and transmission efficiency per hour of the transmission data after encryption in the physical layer, and the configuration thereof is not limited to the various embodiments described above and may be as follows, for example.

For example, when modulation other than the phase modulation is employed as the modulation of the optical signal using the Y-00 protocol, that is, when the intensity modulation and the quadrature amplitude modulation are employed, it is preferable to have the following configuration and specifications. Here, an encryption unit using optical interference (for example, the encryption unit 113 in the example of FIG. 9 or 10 or an encryption unit including a Mach-Zehnder modulator or an IQ modulator) is dependent on the wavelength of the optical signal in modulation. In other words, one wavelength-multiplexed second type optical signal includes the first type optical signal of a plurality of wavelengths, and is dependent on the wavelength. Therefore, there is a limit to the number of wavelengths (channels) and intervals that can be encrypted collectively. Therefore, in order not to exceed the limit of the number of wavelengths (channels) and intervals that can be encrypted collectively, for example, x/2 first type optical signals with long wavelengths among x (x is a positive even number) first type optical signals are multiplexed into a second type optical signal, which is encrypted by an encryption unit A. Similarly, it is preferable to avoid the limit in such a manner that x/2 first type optical signals with short wavelengths among x first type optical signals are multiplexed into a second type optical signal, which is encrypted by an encryption unit A.

Here, a decryption unit using optical interference (for example, the decryption unit having a configuration similar to the encryption unit 113 in the example of FIG. 9 or 10 or a decryption unit including a Mach-Zehnder modulator or an IQ modulator) is dependent on the wavelength of the optical signal in modulation. Therefore, there is a limit to the number of wavelengths (channels) and intervals that can be encrypted collectively. Therefore, it is preferable to avoid by performing decryption using a plurality of decryption units, similarly to the encryption unit described above.

Further, when polarization multiplexing is employed in the optical transmission device 1 described above, the following configuration and use are preferable. Here, in current optical communication systems, when polarization multiplexing is employed, quadrature polarization of light is multiplexed in many cases. Further, the phase modulator, the Mach-Zehnder modulator, and the IQ modulator are dependent on polarization in many cases. In other words, the phase modulator, the Mach-Zehnder modulator, and the IQ modulator are highly dependent on quadrature polarization of light. In other words, in a case of using an encryption unit including the phase modulator, the Mach-Zehnder modulator, or the IQ modulator having polarization dependence described above, it is difficult to collectively encrypt the polarization-multiplexed optical signal. In other words, when attempting to collectively encrypt the polarization-multiplexed optical signal, there is a possibility that quadrature polarization will not have the same modulation, and the encryption will fail. In this case, first, for single first polarized wave, n first type optical signals corresponding to n pieces of transmission data are output in the same manner as in the optical transmission device 1, the n first type optical signals are converted into a wavelength-multiplexed second type optical signal, and the second type optical signal is encrypted into a third type optical signal for the first polarized wave. Similarly, for a second polarized wave to be multiplexed, a third type optical signal for a second polarized wave is generated. Then, a polarization multiplexed optical signal is generated by subjecting the third type optical signal for the first polarized wave and the third type optical signal for the second polarized wave to polarization multiplexing. Thus, wavelength multiplexing and polarization multiplexing can be performed while using the encryption unit including the phase modulator, the Mach-Zehnder modulator, or the IQ modulator having polarization dependence. In other words, it is possible to further improve the transmission/reception equipment and transmission efficiency per hour of the data. An encryption unit independent of polarization can also be used. In this case, the third type optical signal for the first polarized wave and the third type optical signal for the second polarized wave may not be subjected to polarization multiplexing in order as described above. In other words, the wavelength-multiplexed optical signal and the polarization-multiplexed optical signal can be encrypted collectively.

Further, when the polarization multiplexing is employed in the optical reception device 2 described above, the following configuration and use are preferable. As described above, when the polarization multiplexing is employed in the current optical communication systems, quadrature polarization of light is multiplexed in many cases. Further, the phase modulator, the Mach-Zehnder modulator, and the IQ modulator are dependent on polarization in many cases. In other words, the phase modulator, the Mach-Zehnder modulator, and the IQ modulator are highly dependent on quadrature polarization of light. Furthermore, even in a transmission system with single polarization, a state of polarization fluctuates during the propagation of light in the optical communication cable 3. Therefore, the various modulators (phase modulator, Mach-Zehnder modulator, and IQ modulator) used in the decryption unit are preferably independent of polarization.

For example, in the embodiments described above, for the convenience of the description, the optical communication cable 3 is employed as the transmission path for the optical signal transmitted from the optical transmission device 1 and received by the optical reception device 2, but there is no particular limitation to this. For example, a device for optical communication such as an optical amplifier, an optical switch, or a wavelength switch may be inserted between the optical communication cable 3 and the optical transmission device 1 or the optical reception device 2. In addition, an optical transmission path is not limited to something that uses an optical fiber, and may comprise a communication path such that propagation is performed over a so-called optical wireless space, for example. Specifically, for example, a vacuum space including air, water, and universe may be employed as the optical transmission path. In other words, any communication channel may be used between the optical communication cable 3 and the optical transmission device 1 or the optical reception device 2.

Further, for example, each of the transmission data provision units 11-1 to 11-$n$ is incorporated in the optical transmission device 1, but the transmission data may be received from outside of the optical transmission device in accordance with a predetermined reception unit that is wired or wireless, by providing the transmission data reception unit (not shown). Furthermore, a storage device (not shown) or removable media may be used to provide the transmission data. In other words, the transmission data provision unit may have any kind of transmission data obtainment unit.

For example, the cryptographic key provision unit 12 may provide a key sufficient for the cryptographic signal generation unit 13 to generate multi-level data relating to encryption. In other words, the cryptographic key may be a shared key, and may be a key that uses a different algorithm such as a private key and a public key.

For example, the carrier wave generation unit 131-$k$ and the carrier wave generation unit 141-$k$ do not need to be incorporated in the optical transmission device 1. In other words, the optical transmission device 1 may be an optical signal multiplexing/encryption device that is inputted with a carrier wave and transmits a cryptographic signal. Furthermore, the optical signal multiplexing/encryption device may input n optical signals which are a carrier wave on which transmission data is already placed, provide and multiplex the clock signal, and perform multi-level modulation for encryption.

The cryptographic signal transmission unit 14 performs processing such as amplifying the intensity of the cryptographic signal as needed, but configuration may be taken to not incorporate the cryptographic signal transmission unit 14 in the optical transmission device 1, have the optical transmission device 1 output cryptographic data without amplification, and use an external optical signal amplification device (not shown).

For example, in the embodiments described above, for the convenience of the description, fine phase modulation is performed on an optical signal that had been subjected to coarse phase modulation, but there is no particular limitation to this. In other words, the coarse modulation and the fine modulation may be performed in any order. Furthermore, the coarse modulation and the fine modulation may be performed on any path of an interferometer configuration that branches into any number of paths, and the modulated signal may be subject to interference any number of times at any location. Furthermore, other interferometer structures may be provided behind the interferometer configuration. In other words, for example, a Mach-Zehnder modulator cascaded in multiple stages or an IQ modulator cascaded in multiple stages may be used.

Note that the configurations of the optical transmission device 1 and the optical reception device 2 are not limited to those described above when the phase modulation is employed as modulation of the optical signal using the Y-00 protocol. In other words, E/O conversion unit 121-$k$ may be configured by direct modulation of a laser or a combination of a laser and various modulation elements. Specifically, for example, the E/O conversion unit 121-$k$ is configured by a carrier wave generation unit (laser light source with a predetermined wavelength) and one or more modulation elements (for example, a phase modulator, Mach-Zehnder modulator, and an IQ modulator). Further, for example, the E/O conversion unit 121-$k$ may include a modulated laser generation unit and may be configured to directly output a modulated optical signal. Further, the encryption unit 113 may be configured by one or more modulation elements (for example, a phase modulator, Mach-Zehnder modulator, and an IQ modulator). Specifically, for example, the encryption unit 113 may employ a k-stage modulator instead of the two-stage modulator for coarse modulation and fine modulation. For example, in the embodiments described above, for the convenience of the description, fine phase modulation is performed on an optical signal that had been subjected to coarse phase modulation, but there is no particular limitation to this. In other words, the coarse modulation and the fine modulation may be performed in any order. Furthermore, the coarse modulation and the fine modulation may be performed on any path of an interferometer configuration that branches into any number of paths, and the modulated signal may be subject to interference any number of times at any location.

To summarize the above, it is sufficient if a signal processing device to which the present invention is applied is as follows, and various embodiments can be taken. In other words, a signal processing device (for example, the optical transmission device 1 in FIG. 1) to which the present invention is applied comprises: an optical output unit (for example, the optical output unit 111 including the n E/O conversion units 121-1 to 121-$n$ in FIG. 5) that outputs each of n first type optical signals having different wavelengths (for example, n first type optical signals having different wavelengths referred to herein) based on each of n pieces of data (where n is an integer value of 2 or more) to be transmitted (for example, the transmission data provided by the transmission data provision units 11-1 to 11-$n$ in FIG. 6); a multiplexing unit (for example, the multiplexer 112 in FIG. 5) that multiplexes each of the n first type optical signals to generate one second type optical signal wavelength-multiplexed (for example, one second type optical signal wavelength-multiplexed referred to herein); and a multi-level modulation unit that performs multi-level modulation on the second type optical signal based on a predetermined algorithm (for example, the algorithm for the Y-00 protocol referred to herein) to generate a third type optical signal (for example, the third type optical signal encrypted by modulating the second type optical signal into a very large number of multi-levels).

Thus, it is possible to multiplex the n first type optical signals having different wavelengths based on the data to be transmitted, and to generate the third type optical signal subjected to the multi-level modulation based on the predetermined algorithm. In other words, when the third type optical signal is transmitted, the data to be transmitted corresponding to the n first type optical signals having different wavelengths are transmitted at the same time. As a result, the signal processing device can improve the transmission/reception equipment and transmission efficiency per hour of the data to be transmitted by transmitting the third type optical signal after encryption in the physical layer.

The signal processing device further includes a delay unit (for example, the delay units DE-1 to DE-n and the delay units DO-1 to DO-n FIG. 5) that delay a timing at which each of the n first type optical signals is input to the multiplexing unit, based on a timing at which modulation is performed by the multi-level modulation unit (for example, a timing at which the encryption unit 113 modulates the second type optical signal based on the clock signal referred to herein), in at least one of a front stage and a rear stage of the optical output unit.

Thus, the n first type optical signals are adjusted so as to be input to the multiplexing unit at the same timing. In other words, for example, each of the n first type optical signals included in the second type optical signal are input to the multi-level modulation unit at the timing at which modulation is performed by the multi-level modulation unit. As a result, the multi-level modulation unit can collectively perform the multi-level modulation on the second type optical signal corresponding to the n first type optical signals, assuming that the wavelength is multiplexed.

Further, in other words, a signal processing device (for example, the optical reception device 2 in FIG. 1) to which the present invention is applied comprises: a modulation unit (for example, the decryption unit 221 FIG. 12) that converts a first type optical signal (for example, the first type optical signal transmitted from the optical transmission device 1 in FIG. 1) subjected to first multi-level modulation (for example, the modulation for encryption by the encryption unit 113 in FIG. 5) based on a predetermined algorithm (for example, the algorithm for the Y-00 protocol referred to herein) after being multiplexed with respect to n (where n is an integer value of 2 or more) wavelengths (for example, the multiplexing by the multiplexer 112 in FIG. 5) into a second type optical signal wavelength-multiplexed (for example, the sixth type optical signal referred to herein), using second modulation (for example, the modulation for decryption by the decryption unit 231 in FIG. 12) based on an algorithm (for example, the algorithm related to the decryption of the Y-00 protocol referred to herein) corresponding to a predetermined algorithm; and a separation unit (for example, the separator 222 in FIG. 12) that separates the second type optical signal into respective n third type optical signals (for example, the seventh type optical signal referred to herein).

Thus, the first type optical signal subjected to the first multi-level modulation based on the predetermined algorithm after being multiplexed with respect to n wavelengths can be separated into the n third type optical signals (not being subjected to the first multi-level modulation), respectively. In other words, the data to be transmitted corresponding to the n optical signals having different wavelengths are multiplexed and encrypted in the physical layer, and are simultaneously transmitted as a first type optical signal. As a result, the signal processing device can separate the transmitted first type optical signal into the third type optical signal contained in the first type optical signal, thereby separating n pieces of data to be transmitted. In other words, it is possible to improve the transmission/reception equipment and transmission efficiency per hour of the data to be transmitted.

The signal processing device further includes a compensation unit (for example, the compensator 211 in FIG. 12) that compensates a delay until each of components of the n wavelength contained in the first type optical signal reaches the signal processing device to generate a fourth type optical signal (for example, the fifth type optical signal referred to herein), wherein the modulation unit is configured to convert the fourth type optical signal into the second type optical signal, using the second modulation.

Thus, it is possible to compensate for the respective delays until each of the components of the n wavelengths contained in the first type optical signal reaches the signal processing device. As a result, for example, it is possible to achieve a state in which there is no delay between the n third type optical signal having different wavelengths contained in the second type optical signal input to the modulation unit. As a result, since the first modulation of the third type optical signal of n wavelengths contained in the first type optical signal is synchronized, the second modulation can be performed by one modulation unit.

EXPLANATION OF REFERENCE NUMERALS

1 . . . optical transmission device, 11-1 to 11-$n$ . . . transmission data provision unit, 12 . . . cryptographic key provision unit, 13 . . . cryptographic signal generation unit, 14 . . . cryptographic signal transmission unit, 15 . . . clock provision unit, DE-1 to DE-n . . . delay unit, DO-1 to DO-n delay unit, 111 . . . optical output unit, 112 . . . multiplexer, 113 . . . encryption unit, 121-1 to 121-$n$ . . . E/O conversion unit, 131-$k$, 141-$k$ . . . carrier wave generation unit, 132-$k$-$a$, 132-$k$-$b$, 142-$k$-$a$ to 142-$k$-$d$ . . . phase modulator, 151-$k$, 161-$k$, 171-$k$ . . . cryptographic generation unit, 152-$k$-$a$, 152-$k$-$b$, 162-$k$-$a$ to 162-$k$-$d$, 172-$k$-$a$ to 172-$k$-$h$ . . . phase modulator, 2 . . . optical reception device, 21 . . . cryptographic signal reception unit, 22 . . . cryptographic key provision unit, 23 . . . cryptographic signal decryption unit, 211 . . . compensator, 221 . . . decryption unit, 222 . . . separator, 223-1 to 223-$n$ . . . O/E conversion unit, 3 . . . optical communication cable, 4 . . . basic optical transmission device, 41-1 to 41-$n$ . . . transmission data provision unit, 42 . . . cryptographic key provision unit, 43 . . . cryptographic signal generation unit, 44 . . . cryptographic signal transmission unit, 411 . . . optical output unit, 412-1 to 412-$n$ . . . encryption unit, 413 . . . multiplexer, 421-1 to 421-$n$ . . . E/O conversion unit, 5 . . . basic optical reception device, 51 . . . cryptographic signal reception unit, 52 . . . cryptographic key provision unit, 53 . . . cryptographic signal decryption unit, 511 . . . separator, 512-1 to 512-$n$ . . . decryption unit, 513-1 to 513-$n$ . . . O/E conversion unit

The invention claimed is:

1. A signal processing device, comprising:
an optical output unit that outputs each of n first type optical signals having different wavelengths based on each of n pieces of data to be transmitted, wherein n is an integer value of 2 or more;
a multiplexing unit that multiplexes each of the n first type optical signals to generate one second type optical signal wavelength-multiplexed; and
a multi-level modulation unit that performs multi-level modulation on the second type optical signal wavelength-multiplexed based on a predetermined algorithm to generate a third type optical signal, wherein performing the multi-level modulation on the second type optical signal includes performing at least a first stage modulation and a second stage modulation subsequently.

2. The signal processing device according to claim 1, further comprising a delay unit that delays a timing at which each of the n first type optical signals is input to the multiplexing unit based on a timing at which modulation is performed by the multi-level modulation unit in at least one of a front stage and a rear stage of the optical output unit.

3. The signal processing device according to claim 1, wherein the first stage modulation is a coarse modulation and the second stage modulation is a fine modulation.

4. The signal processing device according to claim 1, wherein the multi-level modulation unit includes j stages of multi-level modulations that are performed subsequently, wherein j is an integer value of 2 or more.

5. The signal processing device according to claim 1, wherein the first stage modulation and the second stage modulation are phase modulations.

6. A signal processing device, comprising:
a modulation unit that converts a first type optical signal subjected to first multi-level modulation based on a predetermined algorithm after being multiplexed with respect to n wavelengths into a second type optical signal wavelength-multiplexed, using second modulation based on an algorithm corresponding to a predetermined algorithm, wherein n is an integer value of 2 or more; and
a separation unit that separates the second type optical signal into respective n third type optical signals.

7. The signal processing device according to claim 6, further comprising a compensation unit that compensates a delay until each of components of the n wavelengths contained in the first type optical signal reaches the signal processing device to generate a fourth type optical signal, wherein the modulation unit is configured to convert the fourth type optical signal into the second type optical signal using the second modulation.

* * * * *